(12) United States Patent
Snelgrove

(10) Patent No.: US 9,946,418 B2
(45) Date of Patent: Apr. 17, 2018

(54) SYSTEM AND METHOD FOR SENSING TOUCHES IN CAPACITIVE PANELS

(71) Applicant: KAPIK INC., Toronto (CA)

(72) Inventor: William Martin Snelgrove, Toronto (CA)

(73) Assignee: KAPIK INC., Toronto (CA)

( * ) Notice: Subject to any disclaimer, the term of this patent is extended or adjusted under 35 U.S.C. 154(b) by 200 days.

(21) Appl. No.: 14/878,202

(22) Filed: Oct. 8, 2015

(65) Prior Publication Data

US 2016/0103524 A1 Apr. 14, 2016

Related U.S. Application Data

(60) Provisional application No. 62/061,505, filed on Oct. 8, 2014, provisional application No. 62/061,802, filed on Oct. 9, 2014.

(51) Int. Cl.
*G06F 3/044* (2006.01)
*G06F 3/041* (2006.01)

(52) U.S. Cl.
CPC ............ *G06F 3/044* (2013.01); *G06F 3/0416* (2013.01); *G06F 2203/04104* (2013.01)

(58) Field of Classification Search
CPC ......... G06F 2203/04104; G06F 3/0416; G06F 3/044

See application file for complete search history.

(56) References Cited

U.S. PATENT DOCUMENTS

| | | | |
|---|---|---|---|
| 2010/0060591 A1 | 3/2010 | Yousefpor et al. | |
| 2013/0057298 A1* | 3/2013 | La Rosa | G01R 27/2605 324/610 |
| 2013/0176271 A1 | 7/2013 | Sobel et al. | |
| 2014/0354602 A1* | 12/2014 | He | G06F 3/017 345/175 |
| 2015/0084895 A1* | 3/2015 | Huang | H02P 25/032 345/173 |
| 2015/0091859 A1* | 4/2015 | Rosenberg | G06F 3/044 345/174 |
| 2016/0357327 A1* | 12/2016 | Chang | G06F 3/0418 |
| 2017/0038910 A1* | 2/2017 | Lee | G06F 3/0416 |

* cited by examiner

*Primary Examiner* — Temesghen Ghebretinsae
*Assistant Examiner* — Paras D Karki
(74) *Attorney, Agent, or Firm* — Perry + Currier Inc.

(57) ABSTRACT

A multi-touch sensing system and a method for estimating a location of at least one touch point are provided. The multi-touch sensing system includes a panel, a grid of conductor disposed on the panel, a driver array connected to the grid, a receiver array connected to the grid, a signal processing system, and a controller. The method involves transmitting drive signals to the grid, receiving signals from the grid, estimating a capacitance, and transforming the capacitance into touch coordinates.

20 Claims, 26 Drawing Sheets

SYSTEM AND METHOD FOR SENSING TOUCHES IN CAPACITIVE PANELS

CROSS-REFERENCE TO RELATED APPLICATION

This application claims the benefit of U.S. Provisional Patent Application 62/061,505, Filed Oct. 8, 2014, and U.S. Provisional Patent Application 62/061,802, Filed Oct. 9, 2014 the entire contents of which are incorporated herein by reference.

FIELD

The present invention relates to a system and method for sensing touches in capacitative panels.

BACKGROUND

Capacitative panel touchscreens have been used as user input devices for many years, yet their usage is still increasing with the more widespread adoption of touchscreen computing devices. Further, the recent development of capacitative touchscreens that can detect and recognize multiple touches, so called multi-touch sensing, has further increased the usage of such touchscreens.

It is desirable to sense variations in the capacitances of and between rows and columns of a grid of conductors on a panel, for example to allow multi-touch interaction with a computer program.

Methods suitable for sensing multi-touch on small panels are known, but they scale poorly to large panels because: the length of time required for a scan is fixed (by the voltage, size of the capacitive elements and other physical factors) and therefore the length of time available for measuring a given capacitance decreases as panels grow larger; because larger panels are more susceptible to interference; because coupling between adjacent conductors is stronger on larger panels; and because power consumption increases with larger panels.

Existing methods attempt to compensate for reduced measurement time by driving the panel with higher voltages, but this causes practical circuit difficulties, increases electromagnetic interference from the panel, and is still sensitive to impulse disturbances. Operating at higher test-signal frequencies also increases electromagnetic interference and in addition causes interaction between rows of the grid.

SUMMARY

This disclosure provides a novel system and method for sensing touches in capacitative panels which obviates or mitigates at least one disadvantage of the.

According to an aspect of the present disclosure, there is provided a multi-touch sensing system operable to estimate locations of touch points on a panel by measuring changes in mutual capacitances between rows and columns of a grid of conductors on the panel, the multi-touch sensing system comprising: a driver array operable to produce a set of overlapping but mathematically independent row drive signals; a receiver array comprising receiver circuits operable to produce digital estimates of received column signals; and a signal processing system operable to estimate coupling capacitances by correlating digitized received signals with the overlapping but mathematically independent drive signals and to determines touches, and the locations of the touches, therefrom.

The driver array further may include several drive subsystems, each driver subsystem comprising a sequence store operable to produce one of the overlapping mathematically independent signals, a fine-timing circuit operable to compensate for propagation delays in columns of the panel, and a line driver circuit operable to drive the row lines at the desired frequency and signal level.

The driver array may be operable to simultaneously drive adjacent or nearby rows with complementary signals, thus reducing outgoing electromagnetic interference and improving spatial resolution by partially cancelling effects of internal coupling. The driver array can be further operable to equalize row voltages to a midpoint voltage by short-circuiting rows driven by complementary signal sequences from time to time, thus reducing baseline drift and power consumption.

The receiver array may further include a plurality of receiver subsystems, each receiver subsystem comprising an integrate-and-dump analog front end and each receiver subsystem responsive to a difference of voltages or currents between adjacent or nearby columns, a fine-timing circuit operable to compensate for propagation delays in rows of the panel, and an analog-to-digital converter operable to digitize the outputs of the integrate-and-dump circuit before each dump.

The signal processing system may be operable to correlate received signals with the overlapping but mathematically independent drive signals. The signal processing system may be further operable to reject impulsive noise. The signal processing system can be further operable to restore the baseline level in a set of differential measurements.

Information derived from measurement of row and column capacitances to ground may be used in combination with information derived from measurement of mutual capacitances to reduce power consumption requirements or to enhance precision or both.

In accordance with an aspect of the invention, there is provided a multi-touch sensing system for estimating a location of at least one touch point. The system includes a panel. The system also includes a grid of conductor disposed on the panel. The grid of conductor is configured to provide capacitances between rows and columns of the grid. Furthermore, the system includes a receiver array connected to the grid for receiving column signals from the grid via a plurality of inputs. The receiver array is configured to sense a pre-charge voltage on a differential pair of inputs selected from the plurality of inputs. The receiver array is further configured to pre-charge the plurality of inputs to increase a voltage detection accuracy. The receiver array is also configured to pre-charge the plurality of inputs between sampling times to substantially equalize a common-mode input to a differential input. In addition, the receiver array is configured to equalize a differential mode for the differential pair of inputs by returning the differential pair of inputs to the pre-charge voltage and reducing slow drifting due to slowly changing offsets. Furthermore, the receiver array is configured to produce digital estimates of the column signals. The system further includes a signal processing system in communication with the driver array and the receiver array. The signal processing system is configured to estimate a coupling capacitance between the columns and the rows by correlating the digital estimates of the column signals with the independent row drive signals. In addition, the system includes a controller for transforming the coupling capacitance into touch co-ordinates by detecting and extracting potential touches from raw differential data collected from the panel.

The driver array may include a first driver and a second driver. The first driver and the second driver may be configured to transmit stimulus waveforms to a first drive line and a second drive line of the grid simultaneously.

Each of the stimulus waveforms may be sinusoids having a distinct frequency and a distinct phase.

The driver array may be further configured to generate a programmable drive pattern allowing a frequency of the drive pattern to be changed to avoid potential interfering signals.

The driver array may be further configured to transmit to a first drive line and to a second drive line differentially, and momentarily short together the first drive line and the second drive line as the independent row drive signals of the first drive line and the second drive line cross when being driven in opposition.

The driver array may be further configured to integrate each of the independent row drive signals in analog and digital domains using at least one of an analog integrator and repeated patterns of the independent row drive signals.

The receiver array may be further configured to integrate each of the column signals in analog and digital domains using at least one of the analog integrator and repeated patterns of the column signals.

The signal processing system may be further configured to program delay adjustments and gain adjustments independently.

The location of the at least one touch point may be detected in the raw differential data.

The controller may transform the coupling capacitance into touch co-ordinates using an interpolation method, wherein the touch co-ordinates are device independent.

The interpolation method may use a modified Singular Value Decomposition (SVD) method to convert the differential raw data into device independent co-ordinates and/or a differently modified SVD method to convert the differential raw data into device independent co-ordinates in the corners and along the edges of the panel in order to maintain accuracy in the corners and edges.

The controller may be further configured to use a Kalman filter to predict a next set up location by projecting the location of at least one touch point into a next panel scan time step.

In accordance with an aspect of the invention, there is provided a method of estimating a location of at least one touch point on a multi-touch sensing system. The method involves transmitting a set of overlapping and independent row drive signals to a grid using a driver array. The grid includes conductor disposed on a panel, the grid configured to provide capacitances between rows and columns of the grid. The method further involves receiving column signals from the grid via a plurality of inputs using a receiver array. Receiving column signals involves sensing a pre-charge voltage on a differential pair of inputs selected from the plurality of inputs. Receiving column signals also involves pre-charging the plurality of inputs to increase a voltage detection accuracy. Receiving column signals further involves pre-charging the plurality of inputs between sampling times to substantially equalize a common-mode input to a differential input. In addition, receiving column signals involves equalizing a differential mode for the differential pair of inputs by returning the differential pair of inputs to the pre-charge voltage and reducing slow drifting due to slowly changing offsets. Furthermore, receiving column signals involves producing digital estimates of the column signals. In addition, the method involves estimating a coupling capacitance between the columns and the rows by correlating the digital estimates of the column signals with the independent row drive signals using a signal processing system. The method also involves transforming the coupling capacitance into touch co-ordinates by detecting and extracting potential touches from raw differential data collected from the panel.

Transmitting may involve transmitting stimulus waveforms to a first drive line and a second drive line of the grid simultaneously.

Transmitting may involve transmitting to a first drive line and to a second drive line differentially, and momentarily shorting together the first drive line and the second drive line as the independent row drive signals of the first drive line and the second drive line cross when being driven in opposition.

The method may further involve programming, using the signal processing system, delay adjustments and gain adjustments independently.

The method may further involve detecting the location of the at least one touch point in the raw differential data.

Transforming the coupling capacitance into touch co-ordinates may use an interpolation method, and wherein the touch co-ordinates are device independent.

The interpolation method may use a modified Singular Value Decomposition (SVD) method to convert the differential raw data into device independent co-ordinates and/or a differently modified SVD method to convert the differential raw data into device independent co-ordinates in the corners and along the edges of the panel in order to maintain accuracy in the corners and edges.

The method may further involve using a Kalman filter to predict a next set up location by projecting the location of at least one touch point into a next panel scan time step.

BRIEF DESCRIPTION OF THE DRAWINGS

Reference will now be made, by way of example only, to the accompanying drawings in which:

FIG. 16 shows various capacitance measurements for an exemplary panel;

FIG. 17 shows exemplary reference and sensed differential measurements;

DETAILED DESCRIPTION OF THE EMBODIMENTS

It is desired to find a system and method for sensing capacitances in touch panels that allows long sensing times while scanning at a high rate, that avoids the need for high voltages, and that materially reduces electromagnetic interference.

The present invention provides a system and method for sensing mutual capacitances in grid-structured multi-touch panels. The present invention relates to a system and method for scanning a grid of capacitances between conductive row and column lines, where scanning is desired to be rapid and yet reliable in the presence of interferers. The technique is applicable to glass or plastic panels placed in front of a display screen, to standalone transparent panels, or to in-cell sensing in which the drive electronics for a display also serve to detect touch. For example, the drive electronics can include a driver array for driving signals to the lines and a receiver array for receiving signals from the lines. It can be combined with techniques that measure capacitance to ground, such as those for detecting one or more touches.

Figure 1:
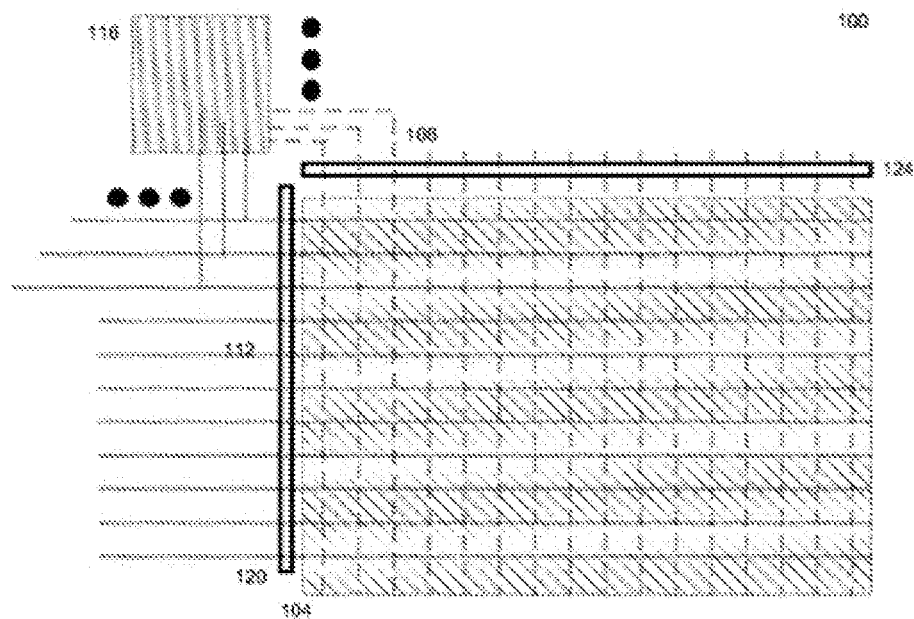
FIG. 1 shows a mechanical representation of a touch panel.

FIG. 1 shows generally at 100 a capacitative touch panel. A transparent panel 104, typically constructed in glass or a polycarbonate, has deposited on its rear side columns 108 of a transparent conductive material (typically Indium Tin Oxide, hereafter ITO). Behind this are rows 112 of conductive material (again typically ITO) with the rows and columns being separated by an insulator, often a plastic film. Each row 112 or column 108 has some capacitance to ground and at each intersection there is some mutual capacitance. By touching the panel at some location a user changes these capacitances, and by measuring these changes it is possible to estimate where the panel was touched.

Rows 112 and columns 108 of touch panel 104 are connected to a controller 116 through row connector means 120 and column connector means 124. This disclosure concerns improvements to controller 116.

Figure 2:
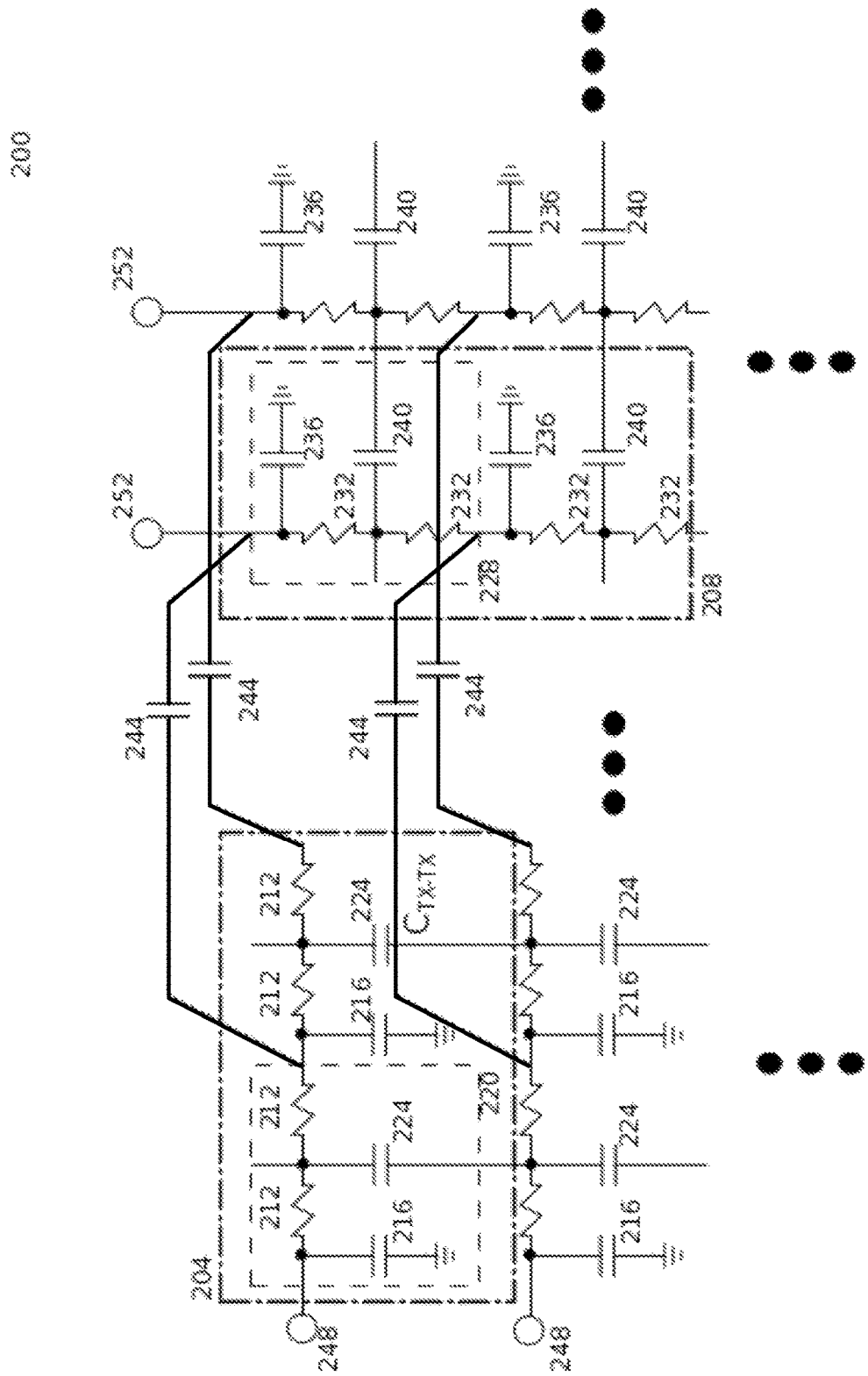
FIG. 2 shows a circuit schematic modeling a touch panel.

FIG. 2 shows generally at 200 a circuit schematic that models touch panel 100. Subcircuit 204 models the rows 112 while subcircuit 208 models columns 108.

Within a subcircuit 204, resistors 212 model the resistivity of the conductive material while capacitances 216 model its capacitance to ground or to the environment. Each row is modelled as a series of unit cells 220, each unit cell typically modelling a row segment corresponding to a column 108. Coupling capacitance from each row unit cell 220 to its neighbouring row unit cell is modelled with capacitances 224.

Similarly the ITO in each column 108 is modelled by subcircuit 208, comprising a series of column unit cells 228, each typically modelling a segment of column 108 corresponding to a row 112. Column resistivity is modelled by resistors 232 while column capacitance to ground is modelled by capacitors 236. Capacitors 240 model coupling capacitance from each column 108 to its neighbouring columns.

Mutual coupling capacitors 244 model capacitance from each row segment 220 to its corresponding column segment 228.

Row pins 248 and column pins 252 correspond to pins of connectors 120 and 124 respectively used to connect touch panel 104 to controller 116.

Touching a point on the surface of panel 104 affects capacitances 216, 236 and 244 in segments corresponding to nearby row/column intersections. Typically capacitances 216 and 236 increase substantially and mutual capacitance 244 decreases slightly. By measuring these changes it is possible to estimate the location of the touch. For systems in which at most one touch is expected at any time it is acceptable to use measurements of capacitances 216 and 236, but for simultaneous touches it is usually preferred to measure mutual capacitance 244 to avoid ambiguous readings. It is the function of controller 116 to measure these capacitances and therefrom estimate positions of screen touches.

Figure 3:
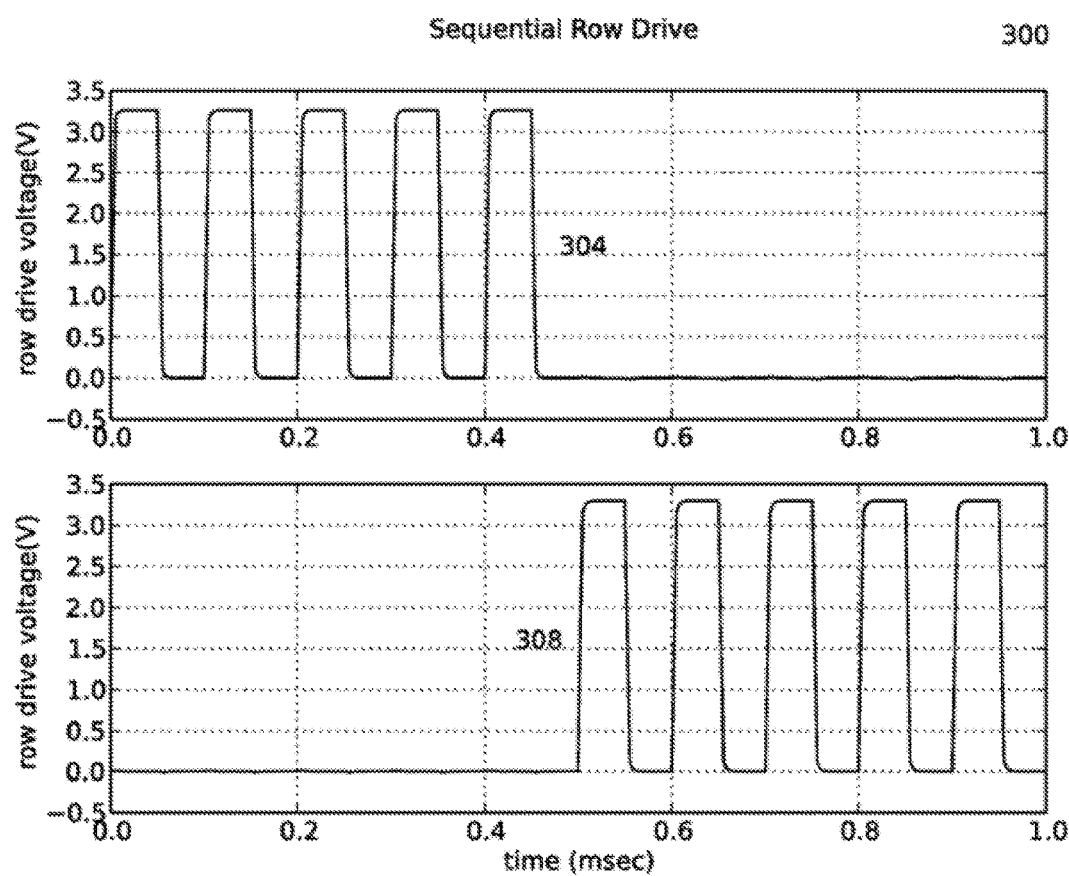
FIG. 3 shows a pair of non-overlapping row drive signals.

FIG. 3 shows generally at 300 a pair of stimulus waveforms for measuring mutual capacitances 244. A first pulse sequence 304 is applied to a first row 112, causing current to flow in all mutual capacitances 244 connected to said first row and thence into corresponding columns 108. By measuring voltages simultaneously at all columns 108, controller 116 can estimate the values of all mutual capacitances 244 connected to the driven first row 112. When these measurements have been made a second pulse sequence 308 is applied to a second row, causing current to flow in mutual capacitances 244 that are connected to said second row; controller 116 can then estimate the values of mutual capacitances 244 connected to the second row. This process continues, applying a sequence of pulses to each row in succession and measuring the corresponding mutual capacitances 244 for all columns on each row in succession, until all mutual capacitances 244 have been measured.

Figure 4:
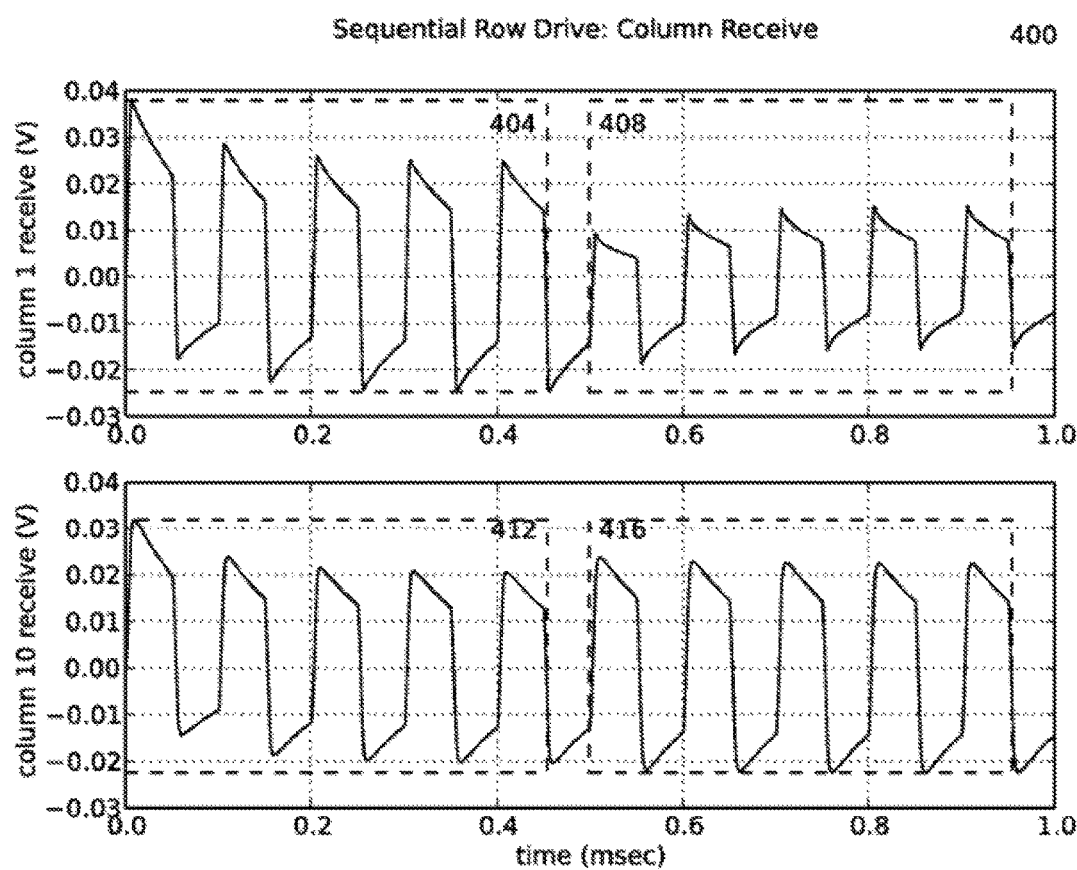
FIG. 4 shows a pair of receive signals.

FIG. 4 shows generally at 400 waveforms measured at two representative columns 108 when the waveforms of FIG. 3 are applied. Waveforms 404 and 408 are segments of a waveform measured at a first column 108 as pulse sequences 304 and then 308 are applied. Note that waveform segments 404 and 408 are distorted versions of pulse sequences 304 and 308, and that waveform segment 408 is materially smaller than waveform segment 404. In the panel model 200 from which these waveforms are taken, mutual capacitance 244 between row 2 and column 1 was ½ of the magnitude of mutual capacitance 244 between row 1 and column 1; thus when row 2 is stimulated by sequence 308, the current flowing through its mutual capacitance 244 is only half as large as that for the mutual capacitance 244 stimulated by sequence 304 on row 1. The smaller magnitude of segment 408 as compared to its neighbours thus reflects the smaller mutual capacitance 244 between the column corresponding to the waveform segment and the row corresponding to the stimulus signal 300 at the corresponding time.

Waveforms 412 and 416, by contrast, are measured in a second column, for which mutual capacitances from rows 1 and 2 are equal, and therefore for which the effects of sequences 304 and 308 are equal. Said second column was taken at the end of the panel farthest from row connector means 120, whereas waveform segments 304 and 308 were taken from a column close to row connector means 120. One skilled in the art will notice that corners are more rounded in waveform segments 412 and 416 than in waveform segments 404 and 408, and will correctly attribute this to the lowpass filtering action of row segments 220. In addition, the person skilled in the art will also observe baseline drift, wherein the levels of consecutive pulses change with time, and will attribute this to AC coupling through mutual capacitances 244 and to the presence of a DC component in row drive waveforms 300.

Figure 5:
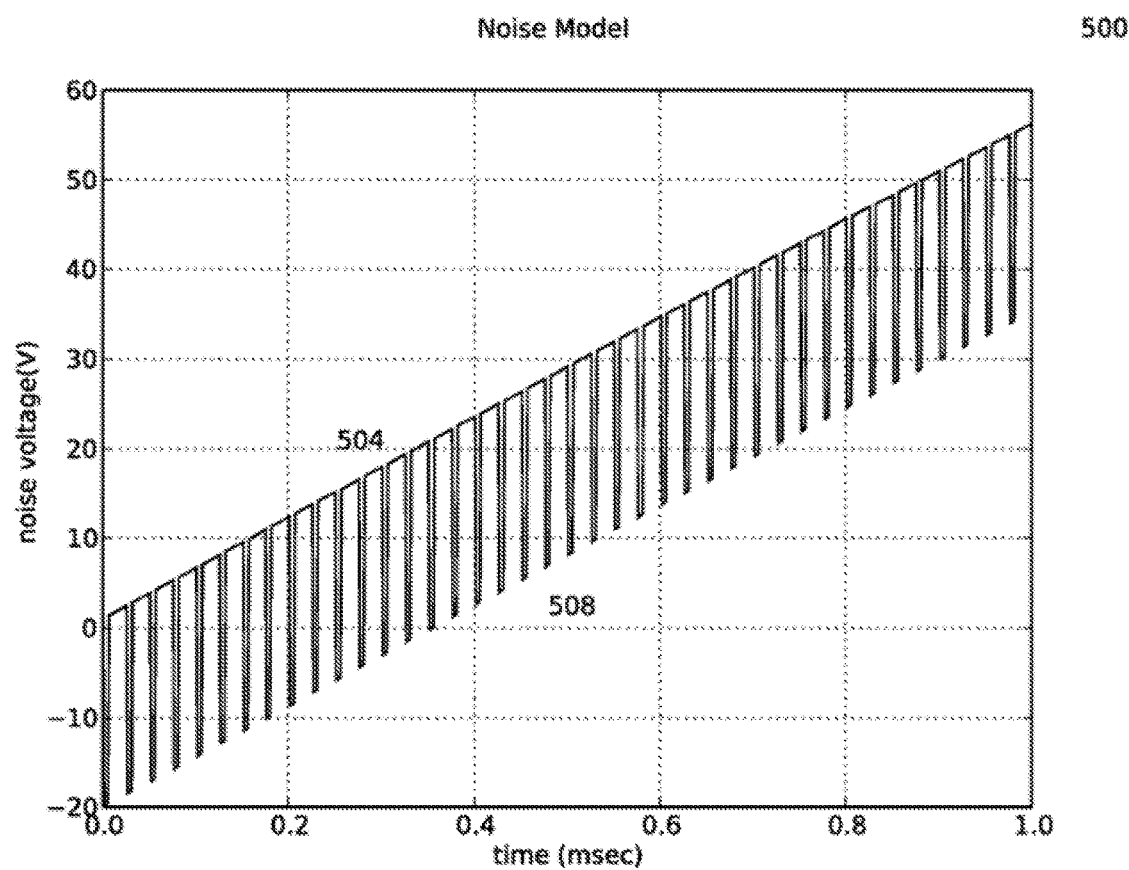
FIG. 5 shows a model of an interference signal.

Interference coupled into the column and row lines is a major source of difficulty in measuring capacitances. FIG. 5 shows generally at 500 a waveform modelling interference comprising a 60 Hz power-line component 504 (at this timescale only approximately 1/16 of a period is visible and so this component appears almost as a ramp) added to a 40 kHz component 508 representing interference from drive electronics in an LCD screen. One skilled in the art will understand that this is a simple exemplary model and that many types of interference can be expected on a large glass panel without any shielding. Interference waveform 500 couples into the panel lines capacitatively, typically through some fraction of capacitances 216 and 236. Because the human body is often well coupled to interference sources, the extent of coupling may be different in areas near a touch than elsewhere.

Figure 6:
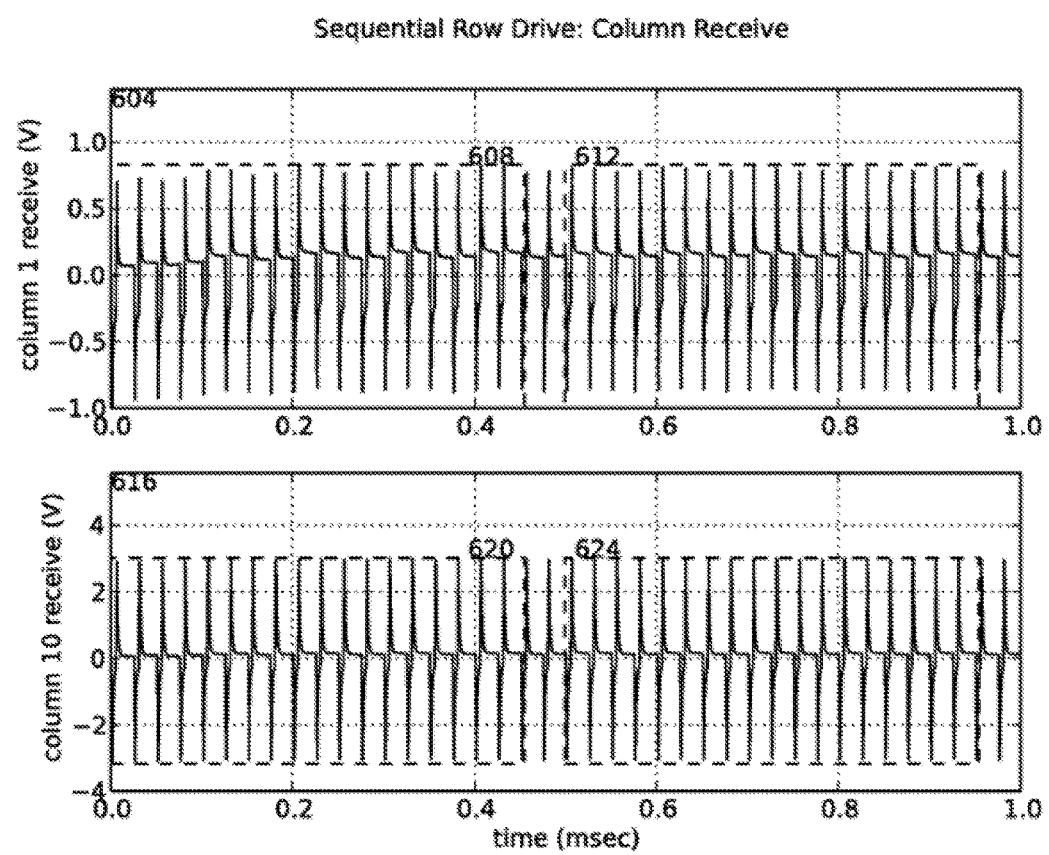
FIG. 6 shows a receive signal corrupted by said interference signal.

FIG. 6 shows generally at 600 column voltage waveforms 604 (for a first column) and 616 (for a second column) in the presence of interference. Because model 200 is linear, mathematically these waveforms are superpositions of desired waveforms 400 due to driving with row signals 300 and waveforms entirely due to interference 500. One skilled in the art will note that interference-free waveforms 400 had peak-to-peak magnitudes on the order of 40 mV whereas waveforms 604 and 616 in the presence of noise have peak-to-peak magnitudes of approximately 1500 mV and 6000 mV respectively: that the signal of interest 400 is therefore small relative to the interferer and therefore difficult to estimate precisely. For example, signal segment 612 represents response with a mutual capacitance 244 of 1 pF whereas signal segments 608, 620 and 624 represent responses to mutual capacitances 244 of 2 pF. This difficulty is aggravated by the fact that interference signals are widely variable and difficult to predict.

One method for reducing the effect of interference is differential sensing, in which the differences between voltages or currents between adjacent rows are sensed rather than the absolute voltages or currents. To the extent that interference is common to adjacent columns differential sensing tends to cancel it. Differential sensing also tends to cancel signals due to equal-valued mutual capacitances 244, thus making it difficult to estimate absolute levels; it is desired to invent a method of correcting this problem.

Figure 7:
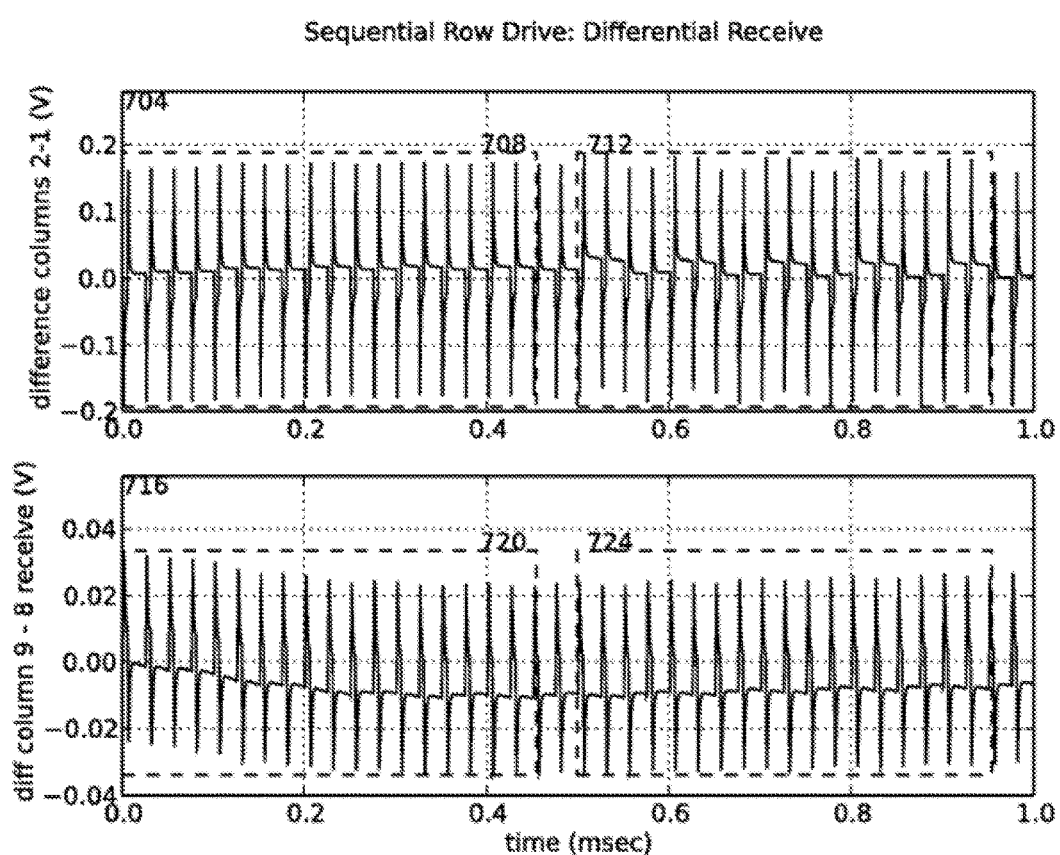
FIG. 7 shows a differential receive signal corrupted by said interference.

FIG. 7 shows generally at 700 exemplary voltage-difference waveforms between adjacent columns for panel model 200; difference 704 is measured on a first pair of columns and difference 716 on a second pair of columns. One skilled in the art will note that peak-to-peak voltage swings in waveforms 700 are 300 to 500 mV, substantially less than those in waveforms 600, and may expect that measurements of mutual capacitances 244 could therefore be proportionately more precise. In addition the person skilled in the art may observe in waveform segment 712 a signal component at the 10 kHz frequency of stimulus signals 300 and may observe that this is largely absent in waveform segments 708, 716 and 720; and may correctly deduce that the two mutual capacitances 244 on said first pair of columns sensed during stimulus 308 on the second stimulated row are materially different whereas the pairs 708 and 720 sensed during stimulus period 304 on the first row are substantially equal-valued, as are mutual capacitances 244 on said second pair of columns as sensed in waveform segments 716 and 720. In addition the person skilled in the art may also observe baseline drift, particularly in waveform segment 720.

A second method of reducing the effect of interference is correlation, comprising generally the steps of multiplying a received waveform by an expected waveform, integrating the product over time, and sampling the resulting integrand. For sufficiently long integration times, and under an assumption of mathematical independence between the desired signal and interference, correlation is known to reject interference.

Figure 8:
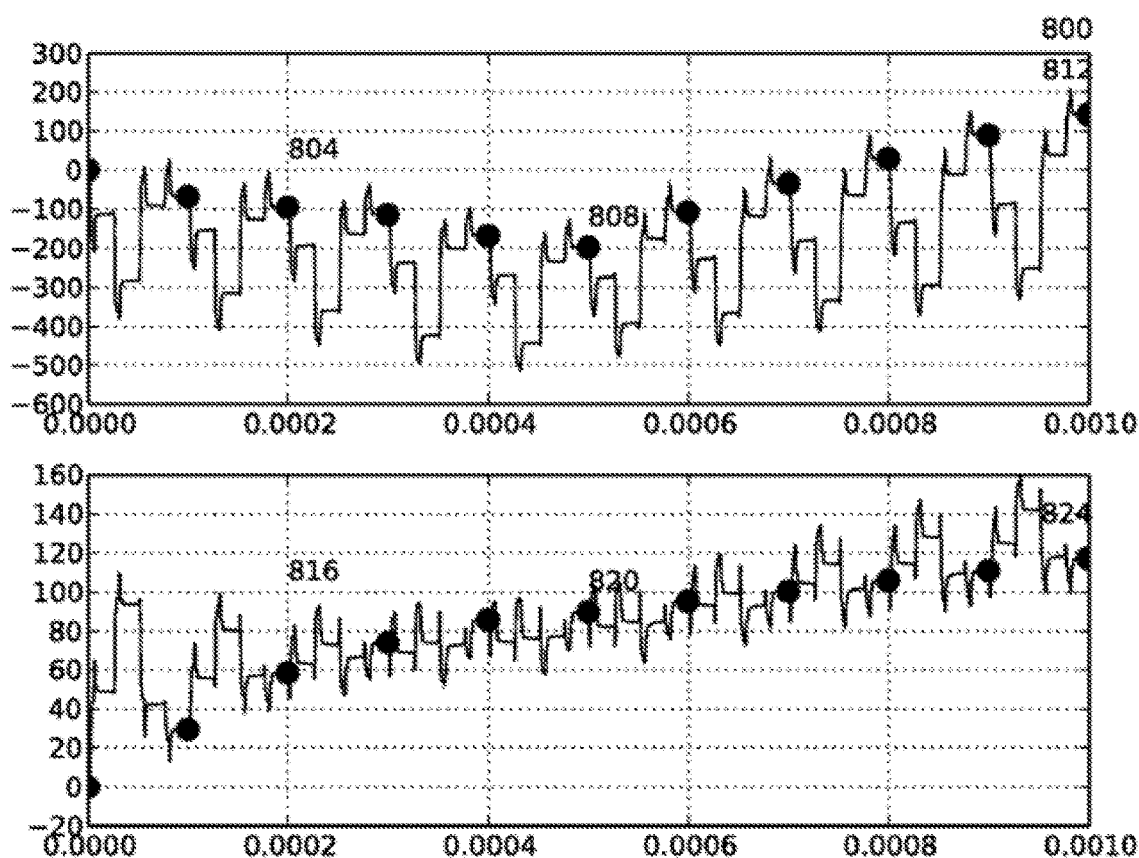
FIG. 8 shows use of correlation to mitigate interference.

It is known that correlation and differential sensing may be used together, and an example of this is shown in FIG. 8 generally at 800.

First integral 804 is obtained by multiplying first differential received signal 704 by a 10 kHz square wave output levels of 1 and −1, which represents an ideal received signal, then numerically integrating the product; and second integral 816 is obtained similarly from second differential received signal 716.

Samples of indefinite integrals 804 and 816, at the 10 kHz period of the desired signal, are marked with solid circles on the diagram, for example at 808, 812, 820 and 824, and one skilled in the art may expect a sequence of these samples to show three effects: an initial transient that dies away exponentially and is due to baseline drift; a steady ramp whose slope is proportional to the component of the desired signal in the input; and random variation due to interference. Values 808, 812, 820 and 824 corresponding to definite integrals over the duration of row stimuli 300 may contain contributions from all three effects. By integrating for long enough the desired ramp component can be made to dominate. For these particular plots, where only 5 pulses are included in each measurement, the skilled observer may consider the initial transient effect to be probably dominant in samples 808, 820 and 824 but that a signal was observable in sample 812.

Even with the combined use of differential reception and correlation to mitigate interference as in FIG. 8, one skilled in the art may consider the overall measurement quality poor and may recommend elimination of baseline drift, use of a longer integration interval, higher stimulus 300 drive levels and perhaps higher stimulus 300 frequencies. In addition the person skilled in the art may also be concerned that simple correlation is susceptible to effects of impulsive interference. It is therefore desired to invent methods of obtaining these improvements.

Of the desired improvements, use of higher stimulus 300 drive levels is known, with voltage swings from 10V to 48V being typical, even though this is power-inefficient and causes practical difficulties with standard circuit technologies—typically limited for reasons of reliability to 3.3V or even lower. It is desired to invent methods of interference mitigation based on the other principles (higher frequencies, reduced baseline drift, longer integration times and improvements on correlation).

Increasing integration times is difficult because it is required to scan an entire panel in a short time so that human interaction appears fluid. For example, it may be desirable to scan a panel completely in 5 milliseconds (i.e. at a 200 Hz rate). If said panel has 100 rows, this allows only 50 microseconds for scanning each row—only one half of a pulse at the exemplary 10 kHz pulse rate of FIG. 3, and worse by a factor of ten than the time judged inadequate in studying FIG. 8.

Elimination of baseline drift is also desired. Baseline drift in FIGS. 4 through 7 is caused by the fact that the average (DC) level applied to a row during stimulus such as pulse stream 304 is nonzero, while the resting state is zero. Changing the resting state to have the same average value as the stimulus state can correct baseline drift but may require circuits capable either of driving pulses negative or of holding the zero state at a value intermediate between the pulse extremes.

Increasing the frequency of stimulus appears desirable from several points of view. It improves rejection of interference at low frequencies, such as near power-line frequencies and the switching frequencies of typical power supplies, increases the bandwidth available for measurement and therefore in principle increase information rate, pumps more current through the capacitances that are to be measured, and divides the measurement into smaller sub-measurements thus making it easier to reject outlier measurements due to impulsive noise; but FIGS. 9 and 10 show two types of difficulties with working at higher frequencies that have heretofore discouraged their use.

Figure 9:
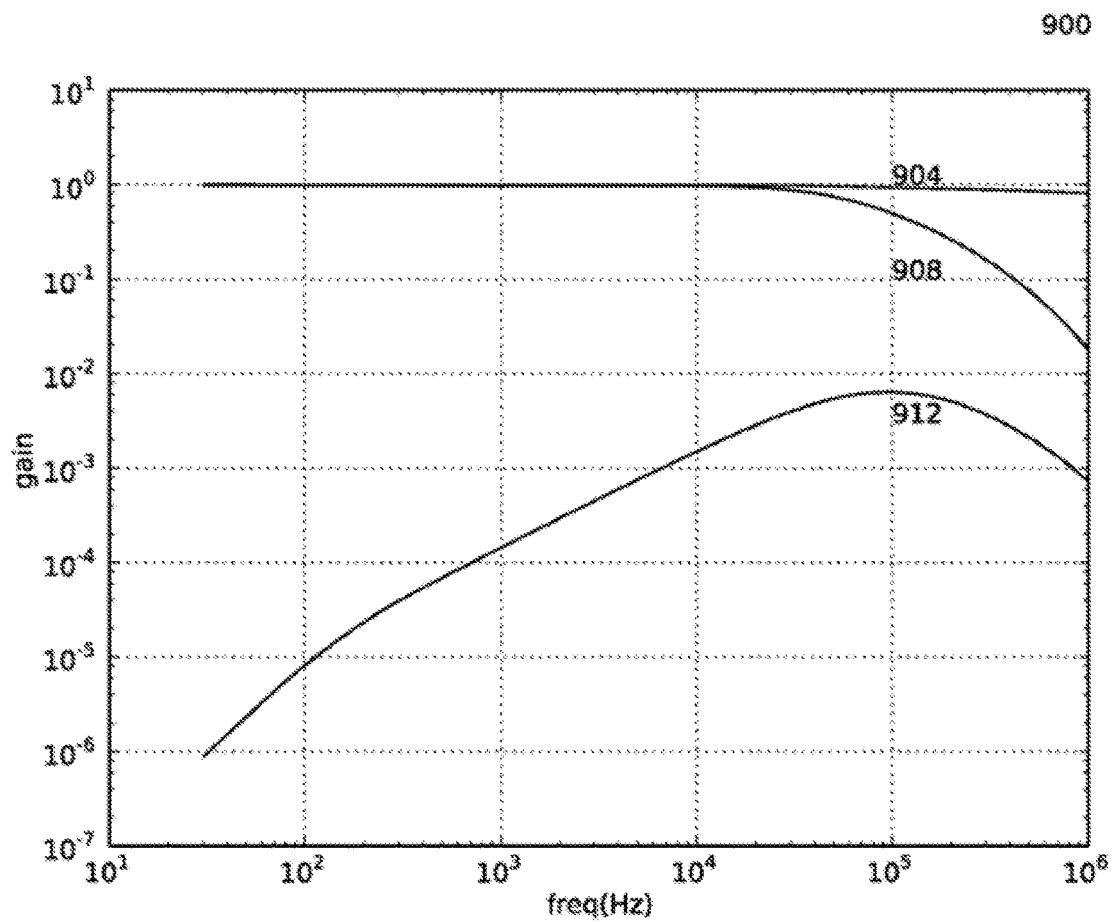
FIG. 9 shows the effect of row coupling in the model of a touch panel.
Figure 10:
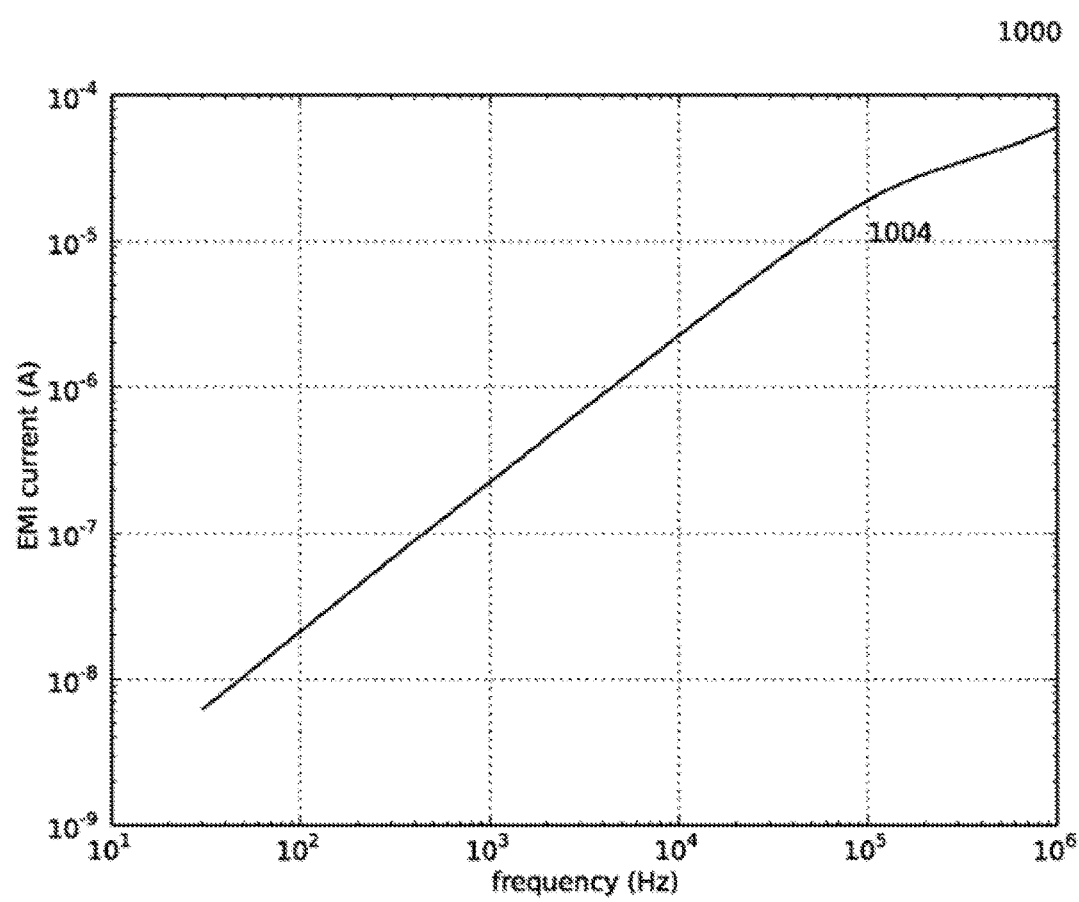
FIG. 10 shows interference caused by drive circuits.

FIG. 9 shows generally at 900 exemplary frequency responses of rolloff and coupling between rows in a panel as modelled by schematic model 200 in FIG. 2. Rolloff is caused by the nonzero row resistivity 212 and by the combined effects of capacitances 216, 224 and 244, and the difficulty it causes is that the stimulus signal is attenuated before it arrives at the point of the desired measurement. Coupling is caused largely by the combination of inter-row coupling capacitances 244 and non-zero row resistivity 212, and the main difficulty that it causes is that stimulus signals applied to a particular row leak into other rows and thereby cause measurements of mutual capacitances 244 for any row to be corrupted by mutual capacitances 244 in other rows.

Curve 904 shows the simplest case, the transfer function between a signal applied at a connector pin 248 and a nearby node in subcircuit 204: it is largely flat up to 1 MHz, and then starts to roll off, suggesting that signals up to 1 MHz are useful. Curve 908, though, shows the transfer function between a signal applied at the same connector pin 248 and a distant node in row model 204: it begins to roll off at 100kHz and is nearly 10 times weaker than the input at 500kHz and nearly 100 times weaker than the input at 1 MHz, suggesting a practical limit of 500kHz.

Curve 912 illustrates the second difficulty, coupling. This curve shows the transfer function from a stimulus applied at a connector pin 248 on a given row 112 and a point on a different row 112 distant from its corresponding pin 248. At 100kHz this coupling signal is approximately 100 times weaker than the direct signal 908, which may be expected to lead to an erroneous contribution of approximately 1% to measurements of mutual capacitances 244 in one row from mutual capacitances 244 in another. A 1% error does not on its face appear important, but one skilled in the art will note that if 100 rows each contribute a 1% error then the net effect may be material. One skilled in the art will also recognize that a similar analysis for both rolloff and coupling applies to columns, so at high frequencies both problems will conspire to weaken and couple signals.

FIG. 10 describes generally at 1000 a second category of problem with working at high frequencies: electromagnetic emissions. Curve 1004 shows the net current induced in nearby conductors—such as human bodies, medical equipment and radios—near to the panel by a 1V stimulus of a single row, as a function of frequency. It models this net effect by estimating that 30% of row-to-ground capacitances 216 and 10% of column-to-ground capacitances 236 are in fact terminated on nearby conductors. As would be expected, this increases roughly proportionally with frequency, making it more difficult to conform with legal limits on electromagnetic emissions when operating at higher frequencies. Current art systems already have difficulty meeting legal emissions requirements when operating at 10 kHz, so it is to be expected that higher-frequency operation may be very difficult; and if higher-frequency operation is combined with higher voltage swings, more difficult yet.

Figure 11:
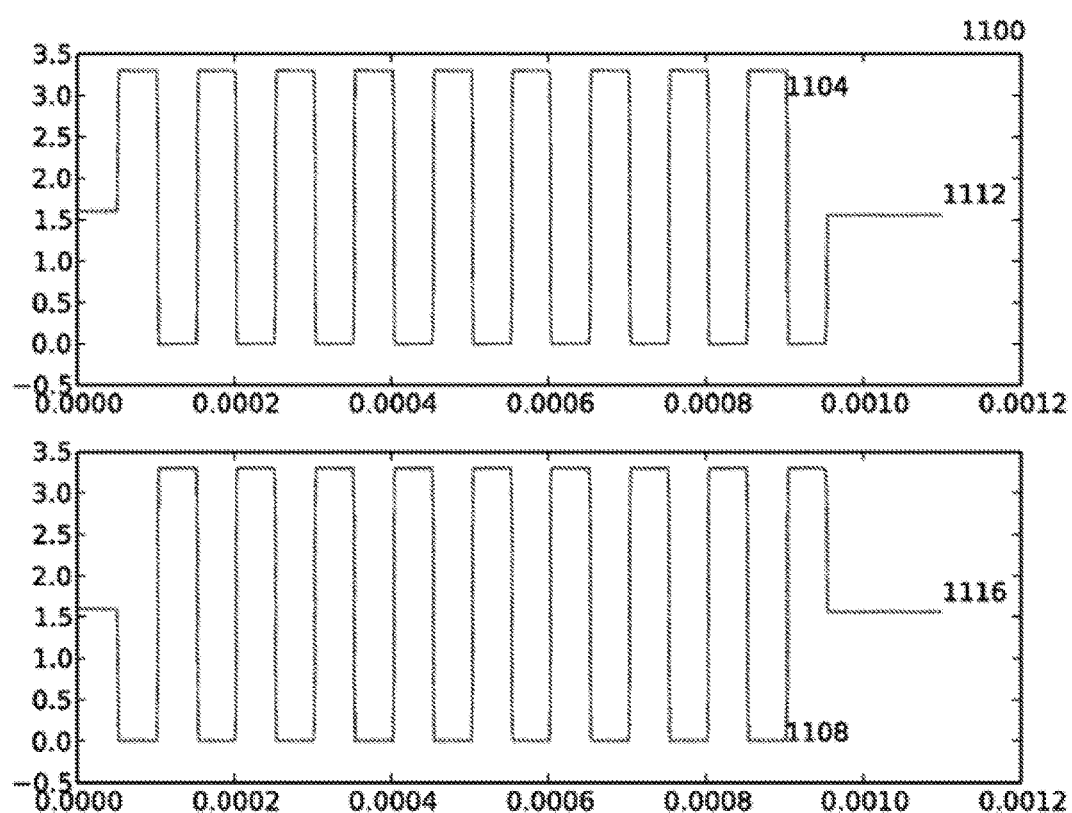
FIG. 11 shows a tristate differential drive signal.

Difficulties with coupling and electromagnetic interference may be mitigated, in accordance with the present disclosure, by driving pairs of rows with complementary signals. FIG. 11 shows generally at 1100 a pair of complementary signals 1104 and 1108 suitable for driving pairs of rows 204, preferably adjacent rows, and operable to mitigate coupling and interference. Signals 1100 also desirably have the same average differential voltage when static as when driven, so that transitions between static and driven states do not cause transients: this may be obtained by equalizing row voltages during the static state as shown at 1112 and 1116: one skilled in the art will note that differential voltages now alternate between equal positive and negative voltages during the active state, averaging zero, and are constantly zero during the static state. Similarly, common-mode voltages (the average of the two row voltages) can preferably remain constant at all times so as to avoid transient effects and electromagnetic interference from common-mode variation: this is also realized by the waveforms 1104 and 1108 during the active mode and 1112 and 1116 during the static mode, where at all times the average voltage is one-half of the power supply voltage (3.3V in the example).

Figure 12:
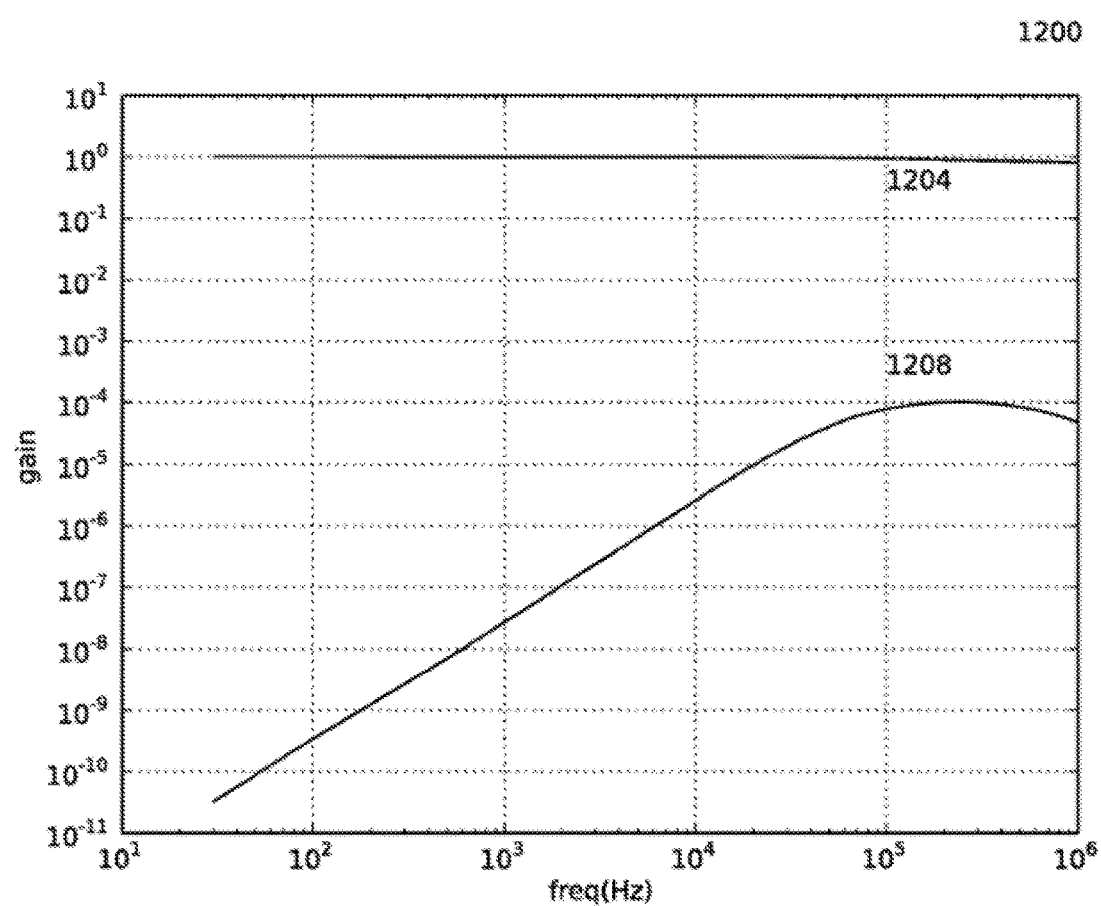
FIG. 12 shows exemplary transfer functions for differential drive.

To demonstrate the efficacy of differential drive in mitigating coupling, FIG. 12 shows generally at 1200 transfer functions 1204 and 1208 from a signal driving an adjacent pair of rows 204 differentially to a point distant on the same row as the driver (1204) and on a row driven only through coupling (1208). Comparison of curve 1204 with curve 904—a comparable test but with conventional single-ended drive—shows that the ability to directly drive a row is not materially compromised; but comparison of curve 1208 with comparable curve 912 for single-ended drive shows that curve 1208 is approximately a factor of one hundred lower, from which it may be expected that coupling problems will also be a factor of approximately one hundred less significant. Alternatively, this advantage can be used to allow use of frequencies approximately one hundred times higher than for single-ended drive while tolerating a given level of coupling.

Figure 13:
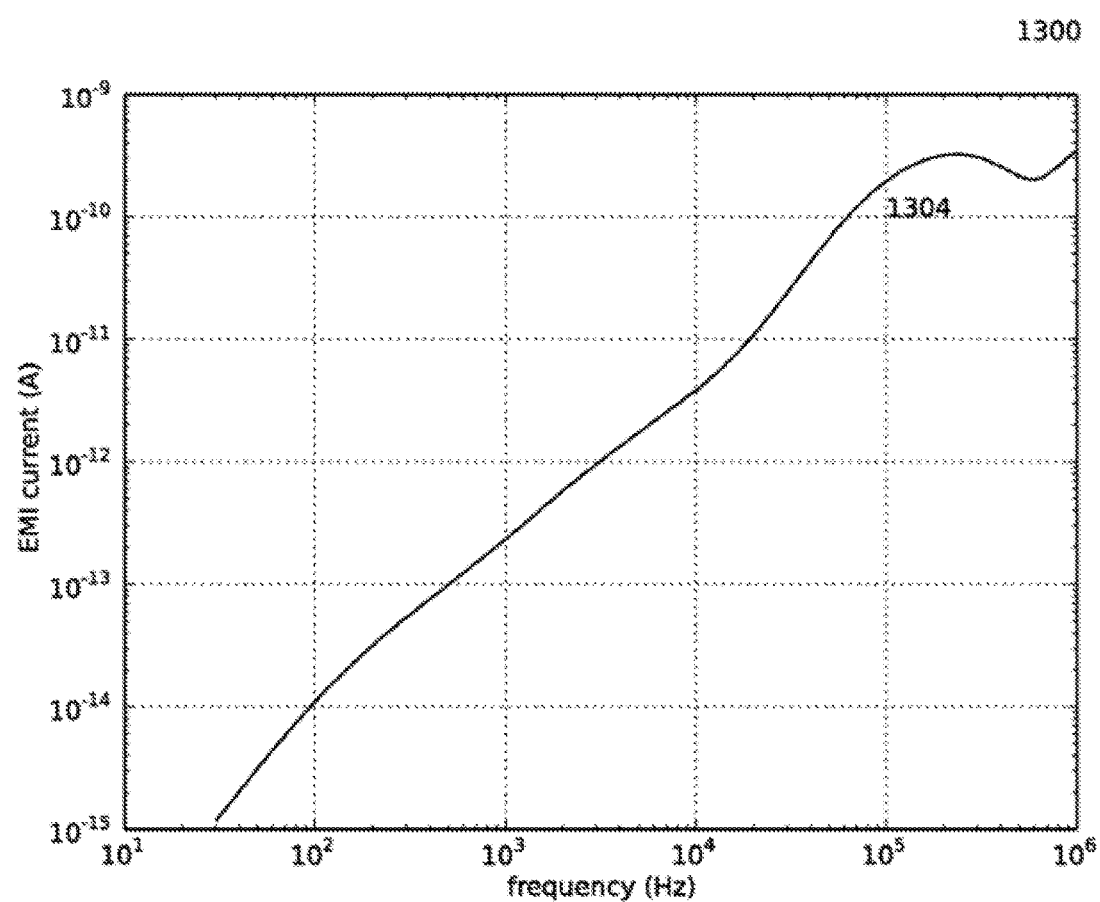
FIG. 13 shows exemplary interference responses for differential drive.

To demonstrate the effectiveness of differential drive in mitigating outgoing electromagnetic interference, FIG. 13 shows generally at 1300 a transfer function 1304 from differential signal currents driving adjacent rows 204 to net currents induced in external conductors under the same conditions as for the single-ended case of transfer function 1004 in FIG. 10. One skilled in the art will observe that induced currents are lower by approximately a factor of 100,000 in the differential case and will therefore expect very substantial reduction in the associated difficulties; and the person skilled in the art will also observe that a reciprocity argument suggests that reduced production of outgoing electromagnetic interference will imply reduction of sensitivity to incoming electromagnetic interference.

Figure 14:
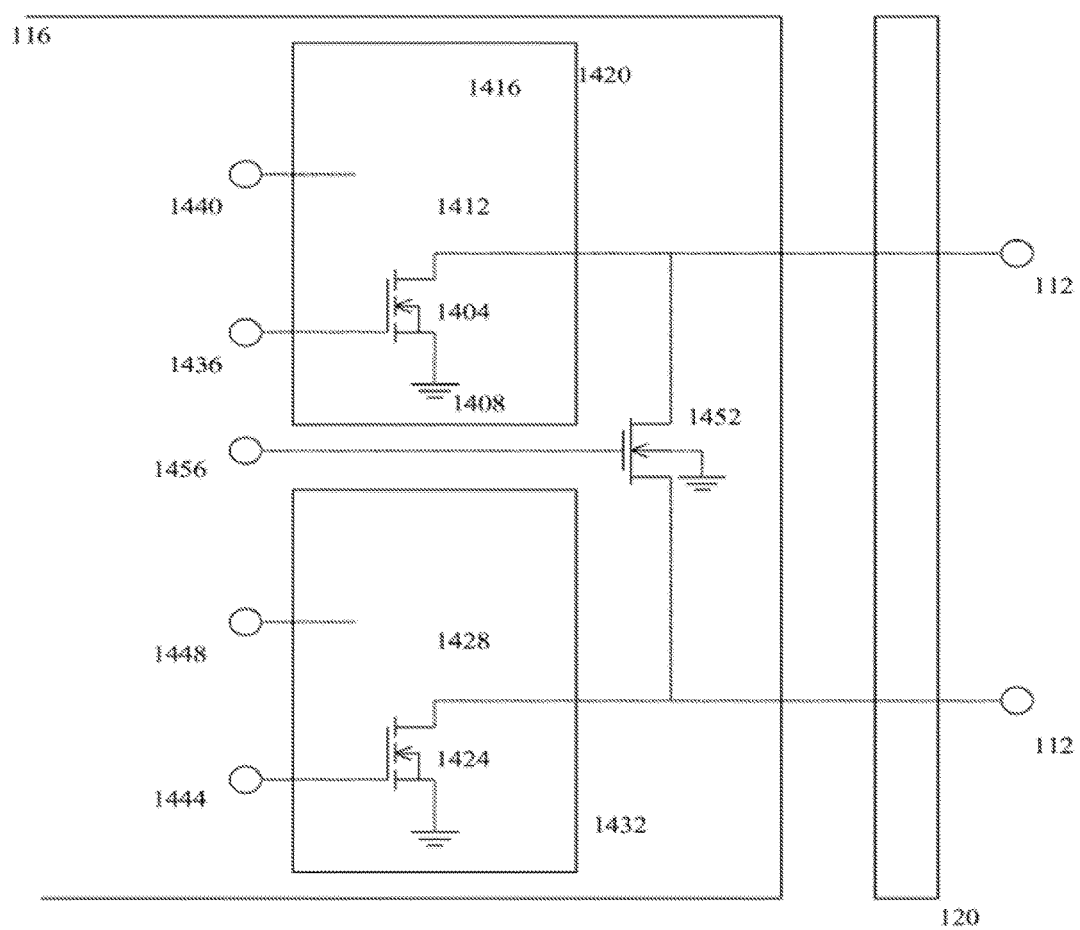
FIG. 14 shows a tristate differential driver circuit.

FIG. 14 shows generally at 1400 a schematic representation of a circuit operable to drive rows 204 in a differential manner so as to produce waveforms 1104 and 1008. NMOS transistor 1404 is operable to pull a first connector pin 112, which in turn may be connected to a first row 204, down to ground potential through ground connection 1408 and PMOS transistor 1412 is likewise operable to pull said first connector pin 112 and first row 204 up to a desired power-supply potential through power-supply connection 1416. Transistors 1404 and 1412 together form a first tristate CMOS driver 1420. Transistors 1424 and 1428 similarly form a second tristate driver 1432 driving a second connector pin 112 and thereby a second row 204. Correct operation of tristate drivers 1420 and 1432 depends on correctly driving control voltages at gates 1436, 1440, 1444 and 1448 of transistors 1404, 1412, 1424 and 1428 respectively. Transistor 1452 is operable to equalize the voltages on the pair connectors 112 and hence on the pair of rows 204, when driven by gate control voltage 1456, and in the typical case where the two rows 204 have substantially equal capacitances this will result in their being forced to a voltage approximately midway between the ground potential at 1408 and the power supply potential at 1416.

Figure 15:
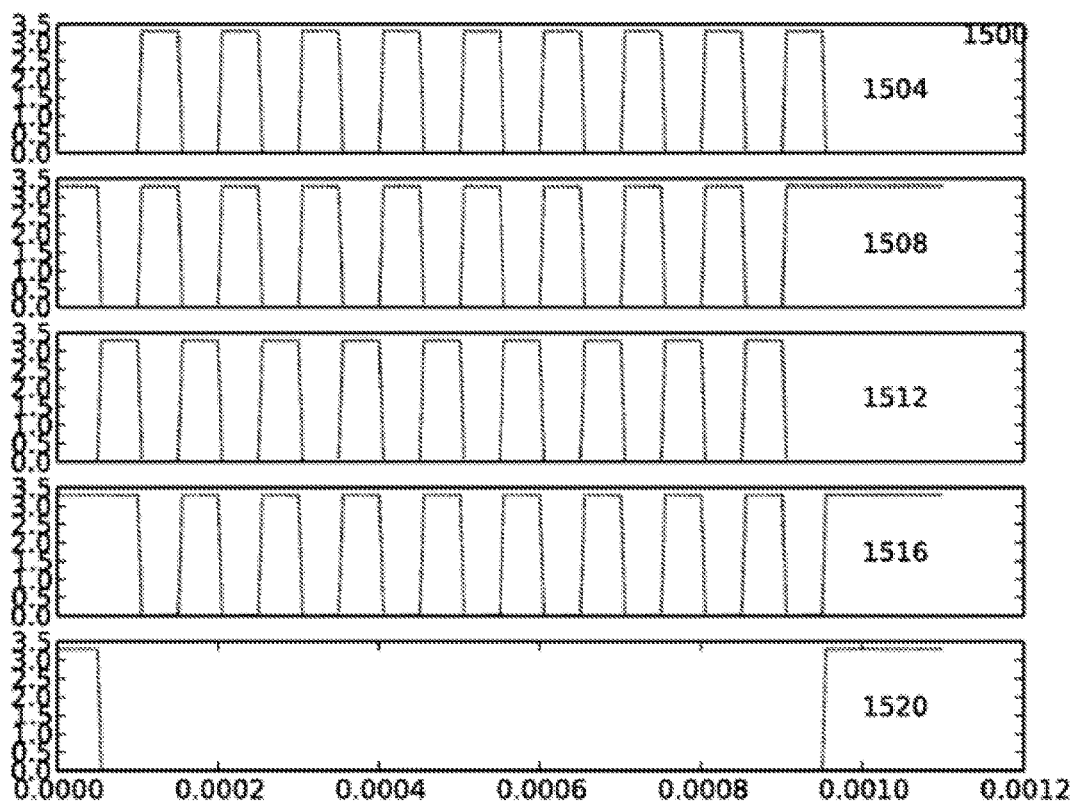
FIG. 15 shows control voltages suitable for said tristate differential driver circuit.

FIG. 15 shows generally at 1500 control voltages 1504, 1508, 1512, 1516 and 1520 suitable for driving said gates 1436, 1440, 1444, 1448 and 1456 respectively of tristate driver 1400, such that the differential drive of a pair of rows 204 is obtained. The particular voltages are shown for a typical case in which power supply connection 1416 is to a 3.3V power supply.

A further improvement to the waveforms 1500 is to equalize the voltages 1104 and 1108 on rows 204 to potentials 1112 and 1116 after each half-cycle rather than only at the end of the sequence. One skilled in the art will see that this preserves the desired properties for differential and common-mode voltages while reducing driver power consumption by almost a factor of two.

Figure 16:
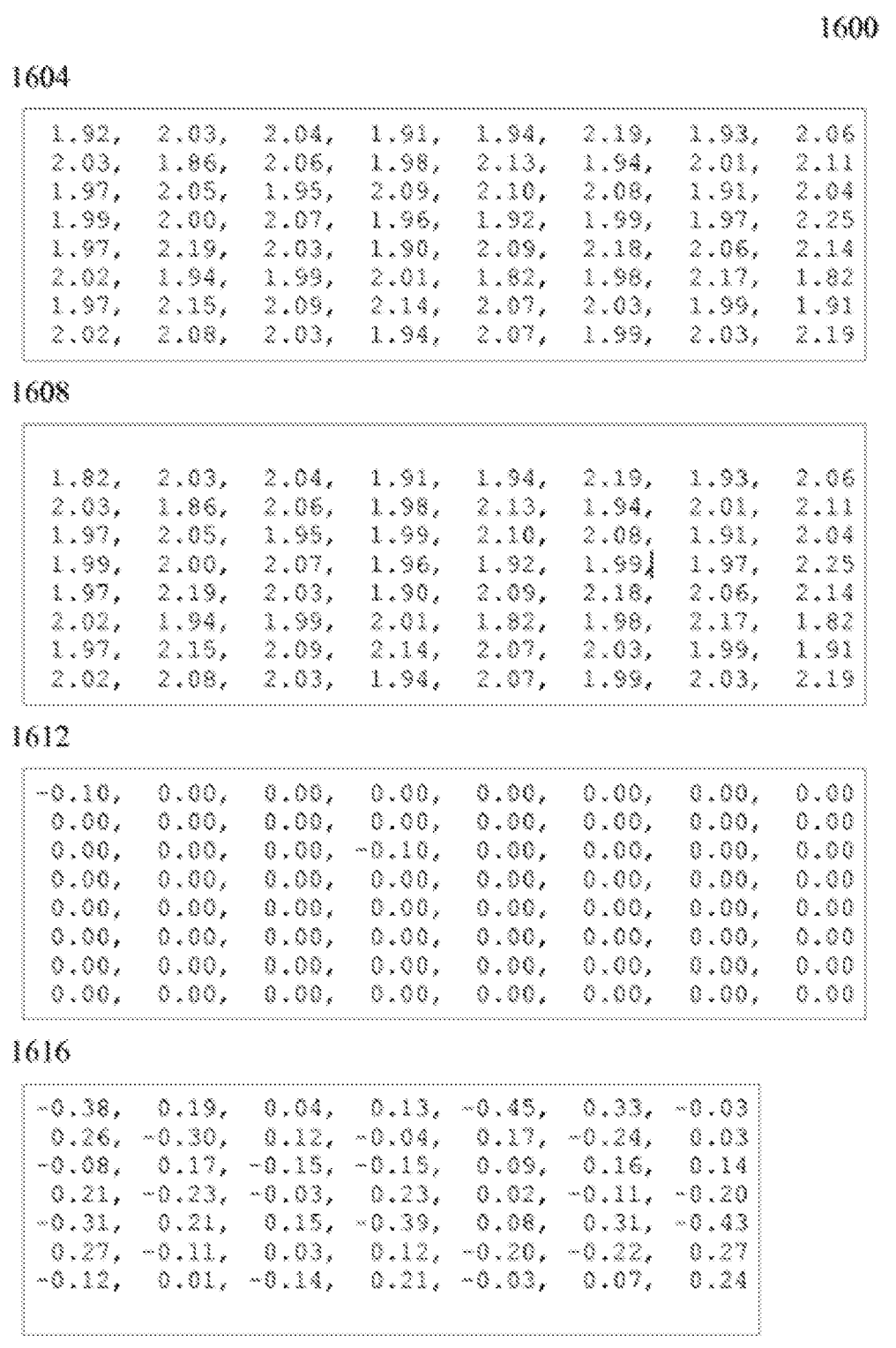

While differential sensing and driving are desirable for the reasons given above, they cause difficulties which have hitherto restricted their application and which are illustrated by the sampling example given in FIG. 16. FIG. 16 exhibits generally at 1600 four tables of values representing measurements of a small exemplary touch panel having 8 rows and 8 columns. The table at 1604 represents, in picofarads, the coupling capacitances between rows and columns of the exemplary panel corresponding to the rows and columns of the table: thus for example the capacitance between the fifth row and second column is 2.19 pF. Touching the panel with a finger near a grid intersection reduces the coupling capacitance between the corresponding row and column, due to fringing fields terminating on the finger, and the table at 1608 shows coupling capacitances when the panel is touched simultaneously at row 1, column 1 and at row 3, column 4. For convenience in exposition, the differences between corresponding entries of tables 1604 and 1608 are shown at table 1612. Additionally, it is assumed that a single touch only affects a single value, where in practice a small group of adjacent points are typically affected together: there is known art for interpolating in these groups to obtain the location of the centroid of the touch. Also for convenience of exposition only touches are shown, whereas it is also known that water droplets on the panel will cause capacitances to increase in the area of the water droplet: the techniques shown below will recover both positive and negative values, and with that data once recovered there is known art for identifying touches while ignoring droplets.

It is desired to reliably measure these capacitance-change values and thereby estimate positions at which the panel was touched. For reasons described above, such as the need to mitigate interference effects, it is however desirable to measure differences between columns, using differential sensing, and between rows, using differential drive. Table 1616 shows the result of measuring the values of table 1612 in this manner.

One skilled in the art will note a fundamental difficulty with using the data of table 1616 to recreate those of table 1612: there are only 7*7 measurements to estimate 8*8 parameters, so that there are fewer equations than unknowns and a unique solution appears impossible. In addition, the person skilled in the art will note that the 0.1 pF variation due to touching the panel is obscured by larger random variations within the panel.

Figure 17:
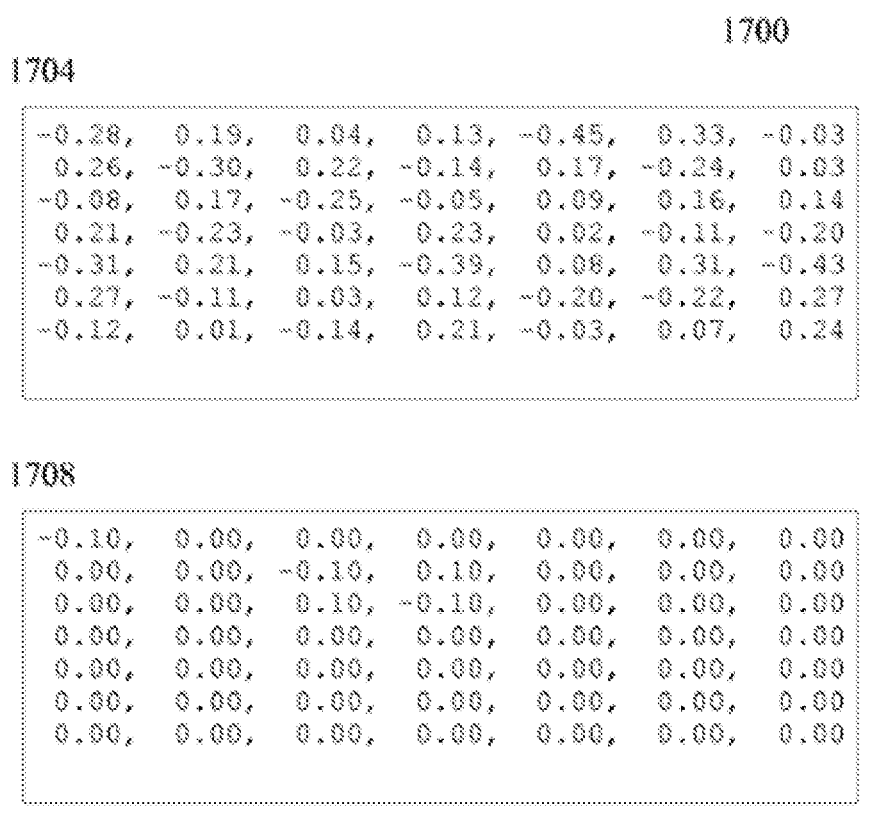

The second problem, pattern noise from random variability in the panel, can be solved by a reference subtraction technique as illustrated generally at 1700 in FIG. 17. Table 1704 shows the results of making a differential measurement similar to that of table 1616 but on the panel while it is not being touched: this measurement encodes capacitance variations intrinsic to the panel. Subtracting corresponding elements of table 1704 from those of table 1616 therefore results in a measurement 1708 for which random variability in the panel is cancelled. One skilled in the art will now note signatures for the two positions (row 1, column 1 and row 3, column 4) touched. Where the panel was touched at a corner, the touch has produced a single nonzero entry at row 1, column 1 in table 1708. Where it was touched in the interior a group of four nonzero entries has appeared where rows 2 and 3 intersect columns 3 and 4.

It is desired to process the data of table 1708 to produce a map of touches like that of table 1612. One skilled in the art may expect a two-dimensional integration to correct some of the effects of differential sensing and driving, but may still not expect to find a unique solution because of the fact that table 1708 specifies only 49 equations for the 64 variables of table 1612.

Figure 18:
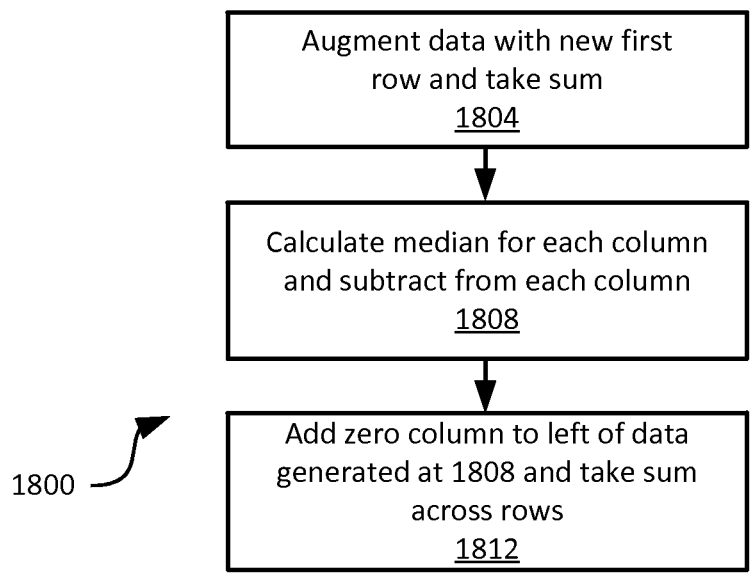
FIG. 18 shows a flow chart for how individual measurements can be obtained from differential ones.

FIG. 18 shows generally at 1800 a series of steps that resolves the difficulty in finding a unique solution, relying on the mathematical property of sparseness in the desired solution shown in table 1612. As a first step at 1804, the data of table 1708 are augmented with a new first row entirely of zeros and then a cumulative sum taken in the column direction; i.e. each entry in a row N is the sum of corresponding rows 1 through N−1 of table 1708. This is a process of numerical integration and hence partially corrects the numerical differencing caused by driving with differential signals; and one skilled in the art will understand that an arbitrary constant of integration may be added to each column integrated this way while still having a valid integral. In addition the person skilled in the art will note that most entries of the newly generated table are zero (as are most entries of desired solution 1612) but that most entries of the first column are non-zero, having value −0.1.

Next, step 1808 is carried out in which the median value of each column is forced to zero: first the medians are calculated for each column, to with −0.1 for the first column and zero for all others; and then said median is subtracted from all rows of the corresponding column. Each column has now been modified by choosing a constant of integration such that its median is zero; and for sparse data that implies that most of the entries in each column will also be zero.

One skilled in the art will recognize that measures other than the median may be used, for example the mode (i.e. the most frequent value) or the minimum. One practical difficulty with using the mode is that noise in measurements may obscure it, while a problem with using the minimum is that positive excursions (as from water droplets) will cause false readings.

Step 1812 is the third step in the process of recovering the touch data of table 1612: a zero column is added to the left of the data generated at step 1808 and then a cumulative sum taken in the row direction, such that column N of a table is the sum of columns 1 through N−1 of table generated at step 1808. The skilled technician will recognize that this is an integration that inverts the effect of differential sensing in the column direction but that a constant of integration is again required. It will now be observed by a person of skill in the art with the benefit of this description that by setting constants of integration for each row equal to the negative of its median, the results will reproduce the data shown in table 1612, as was desired. One skilled in the art will recognize that this technique will succeed as long as the median of each row and column of table 1612 is zero, and this in turn will be true as long as table 1612 is sufficiently sparse (i.e. has few enough non-zero elements). In addition the person skilled in the art will observe that in large touch panels being activated by small numbers of fingers touch data will be sparse: for example a 100*100 panel has 10,000 intersections, so touching 10 points leaves almost all entries at zero even if each touch affects several intersections (typically 4).

One skilled in the art will recognize that many variations of this algorithm can be developed: for example the order of operations between row and column may be exchanged, or the two operations conflated. Similarly, the step of estimating the median may be modified to use joint information between rows and columns (since medians should be zero in both directions) or to use local estimates of medians.

While the above techniques of differential drive and sensing reduce interference and enable use of high-frequency stimulus in large panels, the problem of short scanning times remains. In an exemplary panel with 100 rows and requiring scan at a 200 Hz rate, the row-by-row scanning technique of FIG. 3 only allows 50 microseconds of stimulus per row. Short sensing times reduce the amount of signal energy that can be delivered to overcome interference and increase vulnerability to pulsed interference; therefore a technique that increases sensing time can be used to increase signal-to-noise ratios and hence accuracy or to reduce voltage drive requirements (since increasing voltage drive is another method of increasing signal energy) or both.

Figure 19:
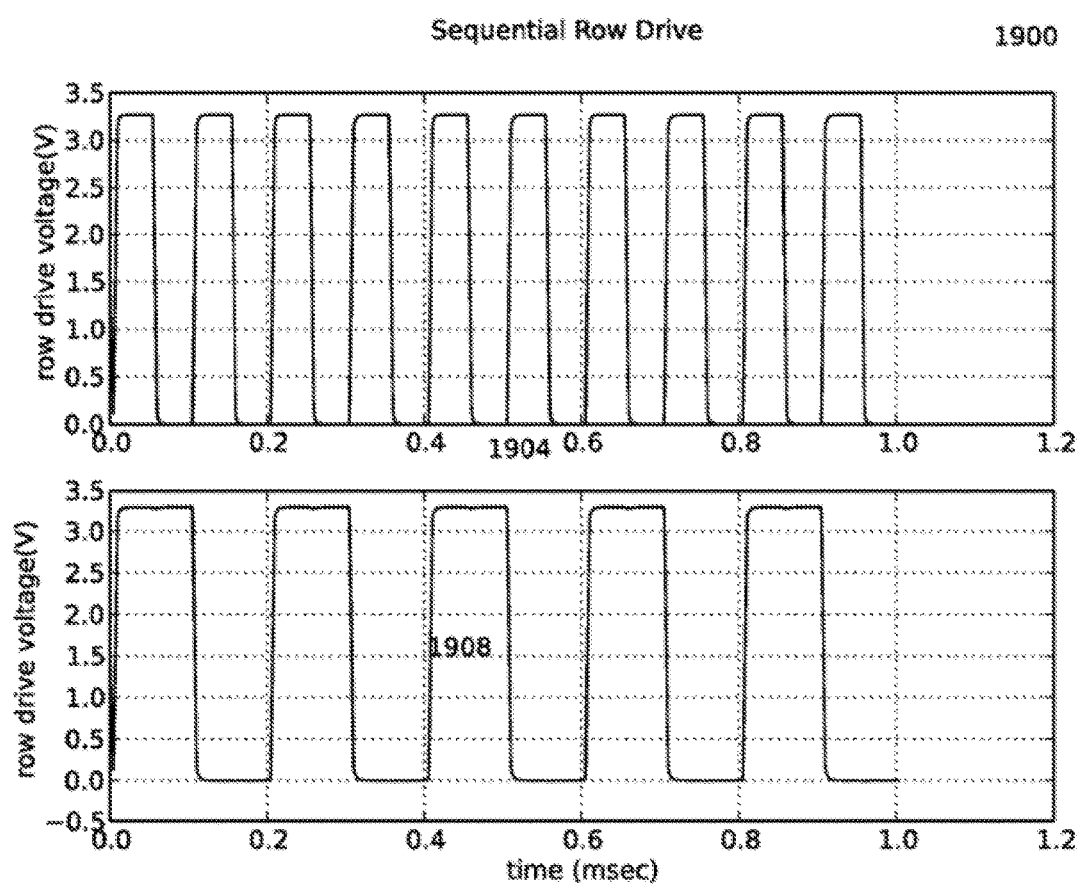
FIG. 19 shows orthogonal waveforms operable for simultaneous drive of two rows.

FIG. 19 shows generally at 1900 exemplary waveforms for a technique for increasing sensing time per row. Like the waveforms 304 and 308 in FIG. 3, waveforms 1904 and 1908 are used to drive two different rows 204 of a touch panel 104; in contrast to the waveforms 304 and 308, waveforms 1904 and 1908 are active simultaneously but operate at different frequencies, waveform 1908 being at one-half of the frequency of waveform 1904. One skilled in the art will remark that this choice of waveforms is a special case of the desirable mathematical property of independence, and as is preferable is a case of the stronger mathematical property of orthogonality. The person skilled in the art will understand that the mathematical independence of waveforms 1904 and 1908 means that different linear combinations (weighted sums) of these waveforms can be distinguished from each other, while the stronger orthogonality condition makes the distinctions large and the weighting factors of the sum easy to extract.

Figure 20:
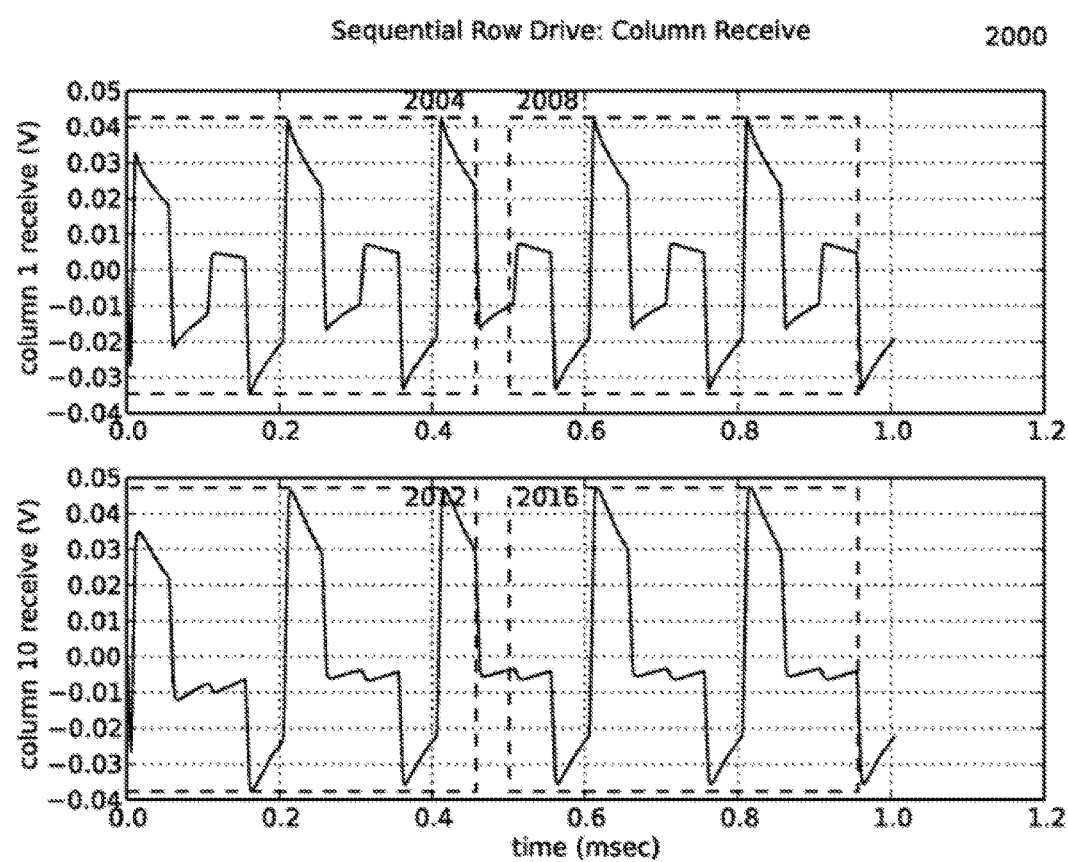
FIG. 20 shows exemplary received waveforms for simultaneous row drive.

FIG. 20 shows generally at 2000 exemplary received column waveforms 2004 and 2008 received at a first column 252 and column waveforms 2012 and 2016 received at a second column 252 in an exemplary touch panel driven by waveforms 1904 and 1908. These can be compared with FIG. 4 waveforms 404, 408, 412 and 416 received at the same columns 252 when the same panel is driven by waveforms 304 and 308 at the same rows 204. Just as in the case of FIG. 4, the capacitances 244 coupling the first and second rows with the second column are equal-valued, whereas the capacitances 244 coupling the first and second rows with the first column are different by a factor of 2.

One skilled in the art will observe that waveforms 2012 and 2016 are similar to each other and both resemble the sum of waveforms 1904 and 1908 after some highpass filtering; and that waveforms 2004 and 2008 are also similar to each other and resemble the result of adding waveform 1904 to one-half of waveform 1908 (i.e. waveform 1908 after its voltages are divided by two), also highpass filtered; and that the equal weighting of waveforms 1904 and 1908 in waveforms 2012 and 2016 corresponds to the equal-valued capacitances 244 coupling the first and second rows 204 to the second column 252 while the two-to-one weighting of waveforms 1904 and 1908 in waveforms 2004 and 2008 corresponds to the two-to-one weighting of capacitances 244 coupling the first and second rows 204 to the first column 252. Thus one skilled in the art will observe that the new stimulus scheme 1900 has the desired new property of extending measurement time (by a factor of two) while retaining the necessary property of allowing identification of individual row-column coupling capacitances 244.

Figure 21:
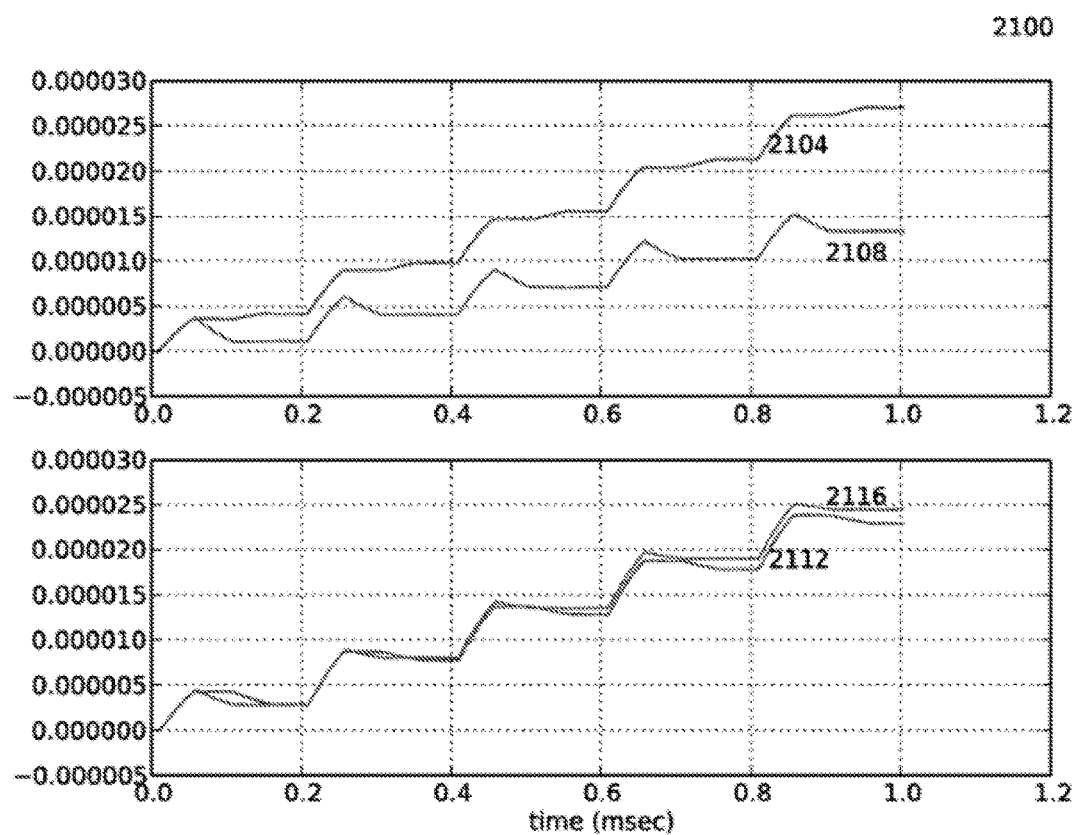
FIG. 21 shows detection of signals by correlation for simultaneous row drive.
Figure 22:
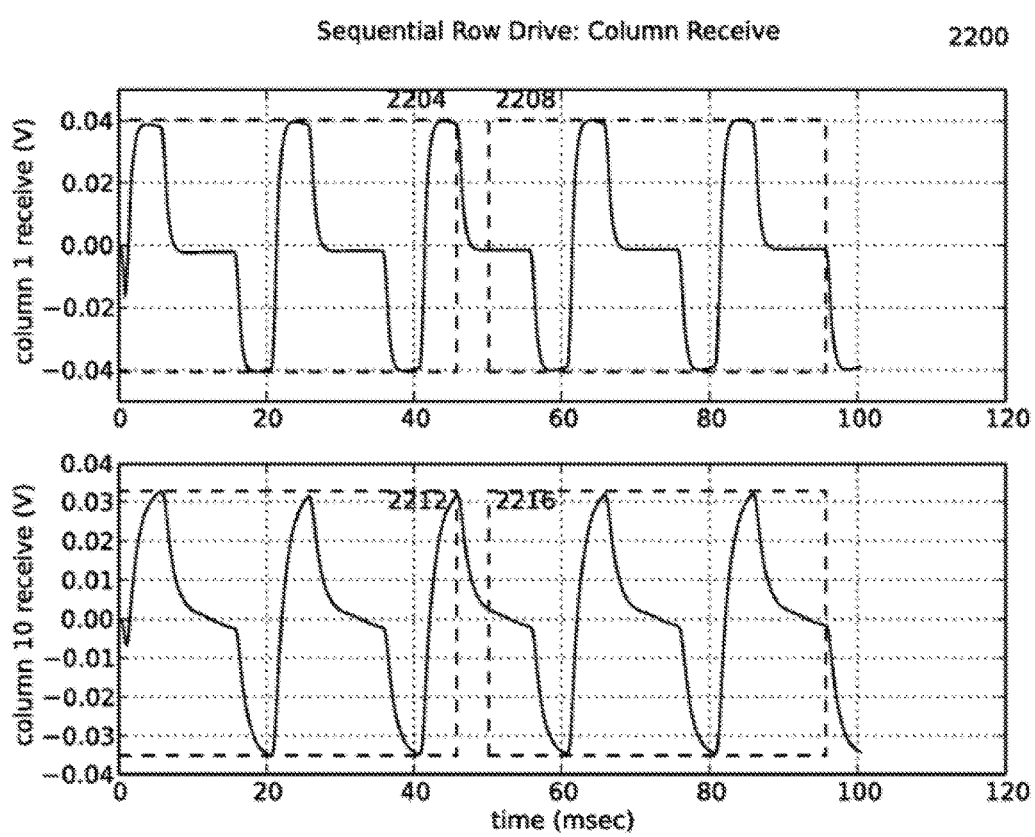
FIG. 22 shows exemplary received waveforms for high-frequency simultaneous drive.
Figure 23:
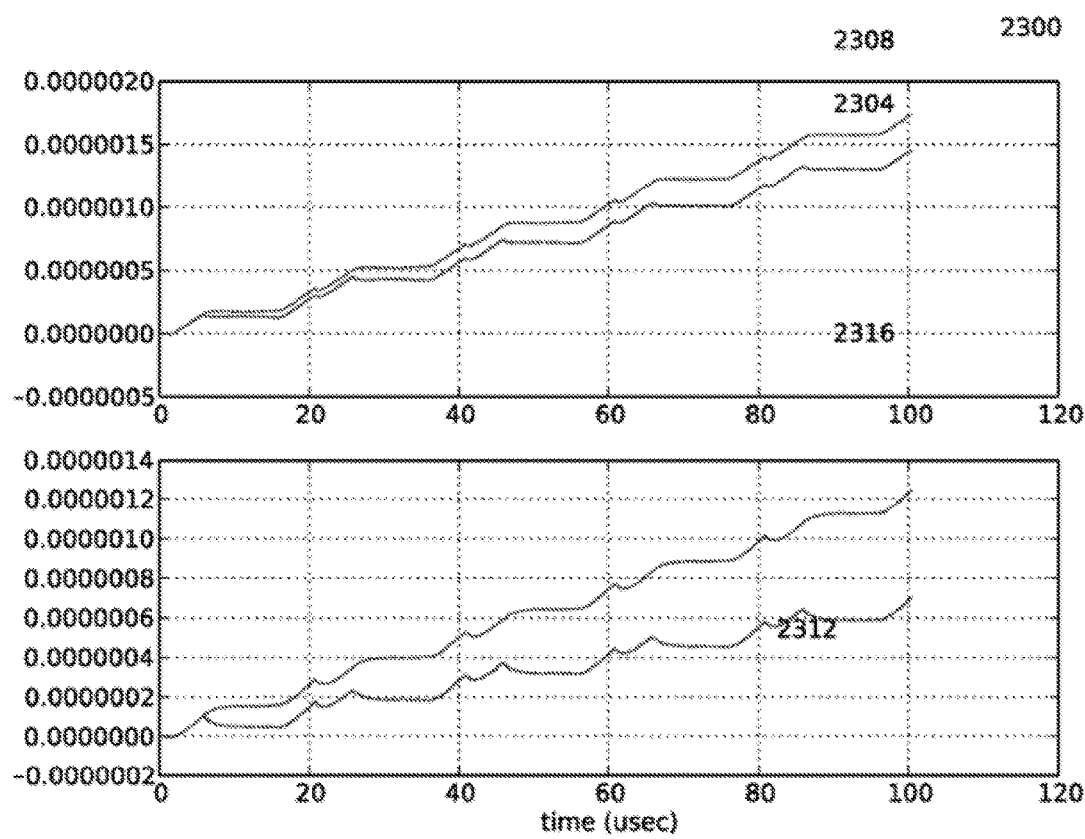
FIG. 23 shows detection of signals by correlation for high-frequency simultaneous drive.

FIG. 21 shows generally at 2100 a use of correlation to quantify these observations. Curve 2104 shows the result of correlating first received signal 2004 and 2008 with first drive signal 1904, while curve 2108 shows the result of correlating the same first receive signal 2004 and 2008 with second drive signal 1908. The final values of curves 2104 and 2108 may be seen to be approximately 0.26 and 0.13 respectively, indicating that capacitance 244 from first row 204 to first column 252 is twice as large as capacitance 244 from second row 204 to first column 252.

Similarly, curve 2112 shows the result of correlating second received signal 2012 and 2016 with first drive signal 1904, while curve 2116 shows the result of correlating the same second receive signal 2012 and 2016 with second drive signal 1908. The final values of curves 2112 and 2116 may be seen to be approximately 0.23 and 0.25 respectively, indicating that capacitance 244 from first row 204 to second column 252 is approximately the same as capacitance 244 from second row 204 to second column 252. These values are also approximately equal to the final values of curves 2104 and 2108, indicating that capacitances 244 from first and second rows 204 to second column 252 are approximately equal to capacitance 244 from first row 204 to first column 252. Exact equality should not be expected, due to edge effects, splatter (as described in FIG. 9) and other variability in the touch panel. It may be noted that in this example the correct ratios of the four capacitances 244 were measured with a stimulus twice as long and hence twice as energetic as for the stimuli 304 and 308.

One skilled in the art will recognize that this technique can be extended to further increase the length of stimuli by using larger sets of orthogonal signals; thus for example the well known Fourier series can be used, with any collection of sines and cosines at distinct multiples of 200 Hz being orthogonal when correlated over a period of 5 milliseconds (1/200 Hz), and by this means, for this example, the individual stimuli can be extended by a factor of 100 from the 50 microseconds of 300 to 5 milliseconds. In general the factor of improvement possible is equal to the number of rows.

While Fourier stimulus has many desirable properties, the circuits required to drive accurate sine and cosine waveforms are materially more complex than those (such as shown at 1400) that drive to binary levels.

For the exemplary 100-row panel scanned at a total rate of 200Hz, the waveforms 1900 (like waveforms 300) are a factor of 10 too slow. Increasing drive frequencies by this factor results in received signals shown generally at 2200, and which can be compared to received signal with segments 2012 and 2016. Received signal 2204 is exemplary of a signal received at a column connector 252 physically close to the row connectors 248 at which row signals are applied (near end), whereas received signal 2208 is exemplary of a signal received at a column connector 252 physically distant from said row connectors 248 (far end). For this example all four capacitances 244 are set to be equal-valued in order to isolate the effect of column-dependent lowpass filtering.

One skilled in the art will note that near-end received signal with segments 2204 and 2208 is less heavily lowpass filtered than far-end received signal with segments 2212 and 2116, and will understand that this is due to the cumulative filtering effect of multiple segments of row resistance 212 having to charge multiple segment capacitances 216, 224 and 244. In addition the person skilled in the art will observe that said near-end and far-end received signals are substantially different from each other, despite the fact that both pairs of capacitances 244 being measured are identical, and be concerned that this will make estimation by correlation inaccurate. The person skilled in the art will also observe this low-pass filtering in curves 904 (for the near-end case) and 908 (for the far-end case).

Illustrating this difficulty, correlations between the transmitted and received signals for this high-speed case are shown generally at 2300, and may be contrasted with the corresponding correlations 2112 and 2116 for low-speed stimulus into equal-valued capacitances. Whereas correlations 2112 and 2116 for low-speed stimulus of identical capacitances were substantially equal, correlations 2304 and 2308 for high-speed stimulus of near-end received signals are approximately 25% different, which is material, and correlations 2312 and 2316 for high-speed stimulus of far-end received signals differ by a factor of two, which is even worse. One skilled in the art will note that correlations 2304 and 2312, which are for the higher-frequency sequence [1, −1, 1, −1], are low compared to 2308 and 2312 respectively, which are for the lower-frequency sequence [1 1 −1 −1] measured at the same receive columns; and also that this is worse for far-end than for near-end signals. The person skilled in the art with the benefit of this description will attribute this to the higher attenuation at high frequencies of far-end gain 908 than for near-end gain 904. The person skilled in the art will be concerned that there may be both gain errors, in which some capacitances 244 are overestimated relative to others, and cross terms, in which current in one capacitance 244 causes changes in values measured for other capacitances 244.

An exact method is provided for correcting these gain and cross-term errors is by matrix inversion: for each collection of rows simultaneously driven and each column at which signals are received, a first matrix is formed with elements corresponding to correlations between row stimuli and received signals for each individual capacitance 244 in said each column, and then this matrix is inverted to give a second matrix that gives a set of capacitances 244 when used to premultiply a set of measured correlations. For example: if it is calculated that driving a first row 204 with waveform 1904 and a second row 204 with waveform 1908 while the mutual capacitance 244 between the first row 204 and a first column 252 is 1 pF and the mutual capacitance between the second row 204 and the first column 252 is zero gives correlation of 1.0 and 0.5, whereas driving in the same way (a first row 204 with waveform 1904 and a second row 204 with waveform 1908) while the mutual capacitance 244 between the first row 204 and the first column 252 is zero and the mutual capacitance between the second row 204 and the first column 252 is 1 pF gives correlations of −0.5 and 2.0, then the first matrix is [[2.0 1.0];[−2.0 4.0]] and inverting it yields the second matrix [[0.4 −0.1]; [0.2 0.2]]. Now if a first unknown capacitance 244 is at the intersection of the first row 204 and first column 252; and a second unknown capacitance 244 is at the intersection of second row 204 and first column 252; and the first and second rows are driven by waveforms 1904 and 1908; and the result of the two correlations of the received signal with the two drive waveforms are 4.0 and 5.0 respectively; then the measurement vector [4.0; 5.0] can be premultiplied by the second matrix [[0.4 −0.1]; [0.2 0.2]] to give result vector [1.1; 1.8]. From this it can be concluded that the first unknown capacitance 244 has value 1.1 pF and the second unknown capacitance 244 has value 1.8 pF. Thus is provided a method for estimating panel capacitances from measurements made at high speeds, where gain and cross-term errors are to be corrected.

When the number of rows simultaneously driven is large, the computational effort required by the matrix-inversion technique will increase. The computational cost of the matrix inversion process that computes the second matrix described above from the first matrix may not be important, because panel characteristics are stable and hence this inversion need not be done at every cycle at a 200 Hz rate. Premultiplication of the correlation vector with the second matrix are done at each cycle, however, proportionally to the number of simultaneous drive signals. for 100 simultaneous stimulus signals, for example, 100 multiply-add steps may be required to estimate each mutual capacitance 244.

An approximate method is now provided for correcting gain and cross-term errors due to use of high-speed stimulus signals, wherein a timing offset and gain correction are used instead of matrix premultiplication.

Figure 24:
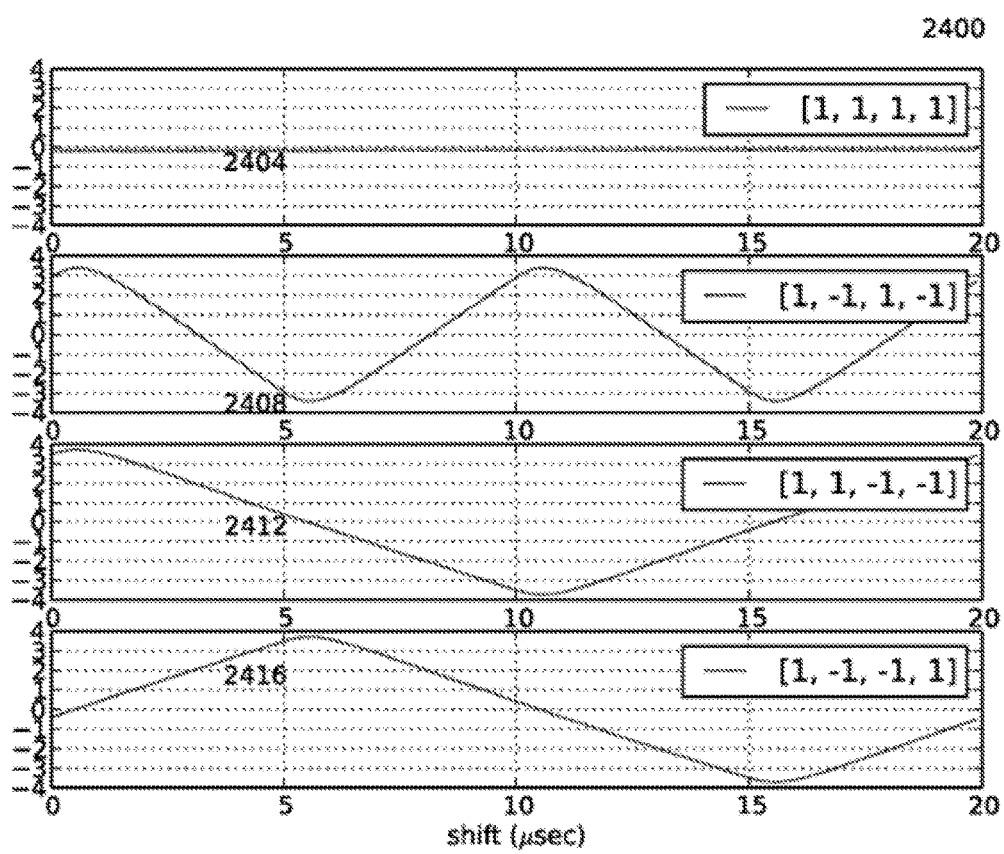
FIG. 24 shows, at a first column, the effect of time delays on detection of signals by correlation for high-frequency simultaneous drive.

FIG. 24 shows generally at 2400 four sets of correlation integrals for a near-end column having equal capacitances 244 from each row when stimulated by rows 2 and 3 of H_4 as described above and with received waveforms 2204 and correlation products 2304 and 2308; the correlations being modified such that the stimulus signals are delayed before being multiplied by the received signal and integrated. Thus for example the value of correlation integral 2408 (corresponding to a stimulus applied from the second row of H_4) at time-shift zero is approximately 2.9 while that of correlation integral 2412 at time-shift zero (corresponding to a stimulus applied from the third row of H_4) is approximately 3.75, which corresponds to the gain errors already observed between curves 2304 and 2308; but curve 2416 (corresponding to a stimulus not applied, from the fourth row of H_4) has value −0.4 and should have value zero (because this stimulus was not applied, so none should appear in the received signal). Thus, a cross-term falsely suggests the presence of a signal from a stimulus that was not applied.

If these curves are read at a time-shift of 0.5 microseconds, curve 2416 has the correct value of zero, and the levels of 2408 and 2416 increase slightly to approximately 3.4 and 3.7 respectively. The time shift has corrected the cross term, and the gain error can be corrected by a single multiplication, scaling estimates from 2408 up by a ratio 3.7/3.4. In the general case in which N terms are required, this technique reduces to one (scaling) multiplication per estimate rather than the N multiply-adds required for the matrix-inversion technique; the cost is that this time-shift technique is approximate, but in practical cases it may be acceptably accurate and the cost of matrix computation undesirable.

Curve 2404 shows the result of correlation with row 1 of H_4; this correlation is essentially zero, because the first row of H_4 is a constant and constant (DC) levels are rejected by the coupling capacitors 244.

Figure 25:
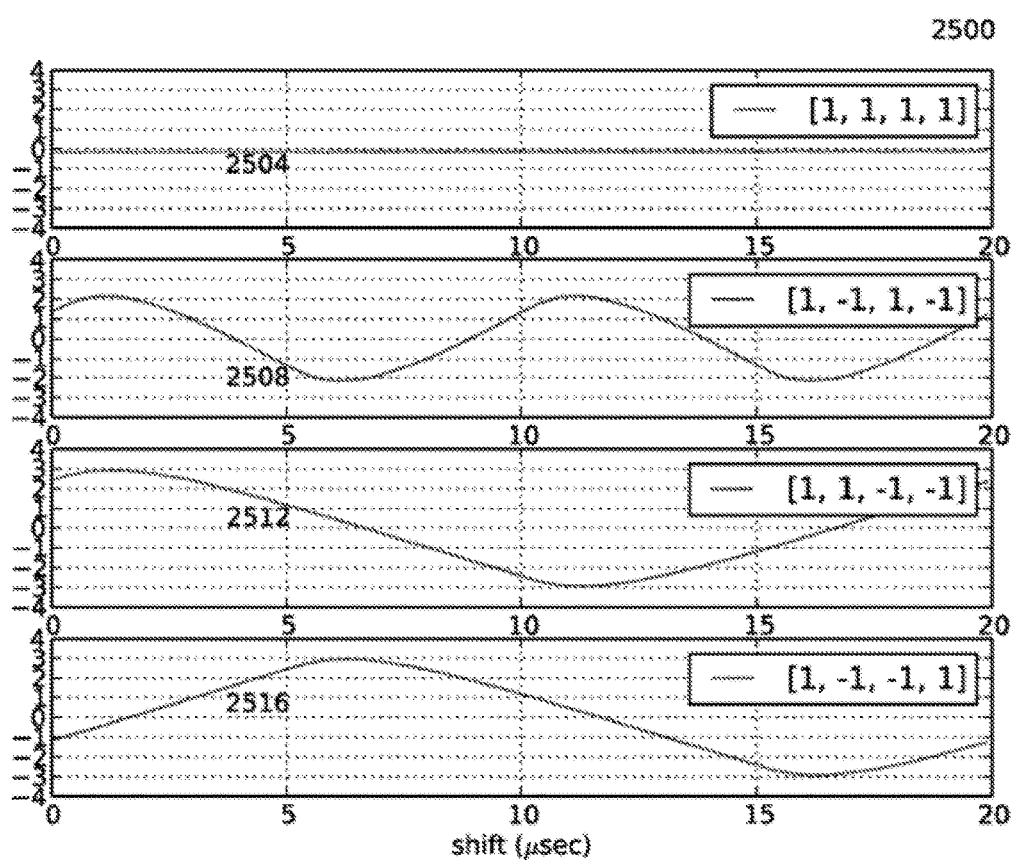
FIG. 25 shows, at a second column, the effect of time delays on detection of signals by correlation for high-frequency simultaneous drive.

FIG. 25 shows generally at 2500 a set of time-offset correlation curves similar to those at 2400, but measured for a far-end column whereas curves 2400 were measured at a near-end column. One skilled in the art will apply the techniques described for curves 2400 to see that the cross-term resulting in 2516 being non-zero may be removed by measuring with a time offset of 1.7 microseconds, at which point curves 2508 and 2512 give improved gains of 2.2 and 2.9 respectively. These gains may desirably be scaled to match the highest near-end gain of 3.7 by scaling the gain of curve 2508 by a factor 3.7/2.2 and scaling curve 2512 by 3.7/2.9. The person skilled in the art will recognize the larger delay (1.7 as opposed to 0.5 microseconds) as symptomatic of group delay in passing through the array, and the additional scaling at the far end as symptomatic of attenuation.

It is desirable to estimate the time offset required to minimize cross terms. In the case where an accurate model such as that at 200 is available this estimate may be obtained by simulation or calculation. In practical cases this model information may be inadequate, for example because a given touch panel controller has to be able to operate with a new panel. The timing information required may be obtained by implementing a controller algorithm based on the calculations presented for waveforms 2400: a panel is stimulated with a set of mathematically orthogonal stimuli from which at least one is missing; correlations are done between received signals and the at least one missing stimulus, and timing is adjusted so as to minimize said correlation.

It is desirable to estimate gain corrections such as the factor 3.7/3.4 described above to correct waveform 2408 to match waveform 2412. Just as for timing correction, if a sufficiently accurate model of the panel is known then calculations or simulations such as those described above to calculate said factor 3.7/3.4 may be used. Again as for timing correction, this may not be practical. The gain information required may be obtained by driving a given row with each desired stimulus waveform in turn, measuring correlations at a given column for the row stimulus chosen, and calculating gain correction factors to make these correlations equal.

It may also be desirable to estimate interference levels when the system is in operation, for example in order to reject measurements corrupted by noise impulses or to set thresholds operable to distinguish between the effects of noise and the effects of capacitance change due to touch. This may be done by correlating received signals with at least one stimulus to all stimuli applied to produce a noise-test correlation: in a noiseless system that has been properly corrected by time-shifts or use of an inverse matrix said noise-test correlation will be zero, but in a system disturbed by random or impulsive noise this noise-test correlation will be non-zero and proportional to the disturbance.

Lowpass filtering occurs both in rows and in columns due to resistivities 212 and 232 in combination with the various capacitances 216, 224, 236, 240 and 244. Thus the matrices or time-delay and gain corrections needed to most accurately correct gain and cross-term errors due to this filtering are in general functions of both row and column locations. If the matrix-inversion method is used to correct these errors then a matrix may be calculated for each row and column; but this may be excessive, since nearby rows and columns will have very similar correction matrices. If the timing-adjustment method is used then stimuli may be applied to different rows with different time delays and received at different columns with different time delays.

Because lowpass filtering in columns is more severe for signals driven into rows far from connectors 252 than for the near-end case, and more severe for waveforms like 1904 with many transitions (high-frequency waveforms) than for waveforms like 1908 with fewer transitions (low-frequency waveforms), it may be preferable to use high-frequency waveforms to stimulate near-end rows and low-frequency waveforms to stimulate far-end rows.

The descriptions above contemplate the use of correlation to separate signals from each other and from noise, and this is a good technique when noise is white, stationary, and Gaussian. Where noise is impulsive, the averaging process of correlation (through use of integration) is not appropriate, because a single outlier measurement can result in a large error in the average. In these cases simple integration may be replaced with a technique that discards outliers. One such technique is the use of a median rather than an average. If the memory or other requirements of a median calculation are problematic, a recursive technique that estimates a running average together with a standard deviation and that disregards measurements differing from the current estimated average by too large a margin relative to the present estimate of the standard deviation: for example disregarding any measurement differing from the present estimated average by more than two estimated standard deviations.

The data produced from the touch panel controller 116 in FIG. 2 (hereafter referred to as raw differential data, also referred to as raw data, in FIG. 8) is subsequently processed in order to transform the differential data collected by the touch panel controller into a list of device-independent touch coordinates The software system converts the data generated in the touch panel controller 116 into a list of device independent coordinates. In addition, a unique identifier is assigned to each uniquely detected touch coordinate pair.

Figure 26:
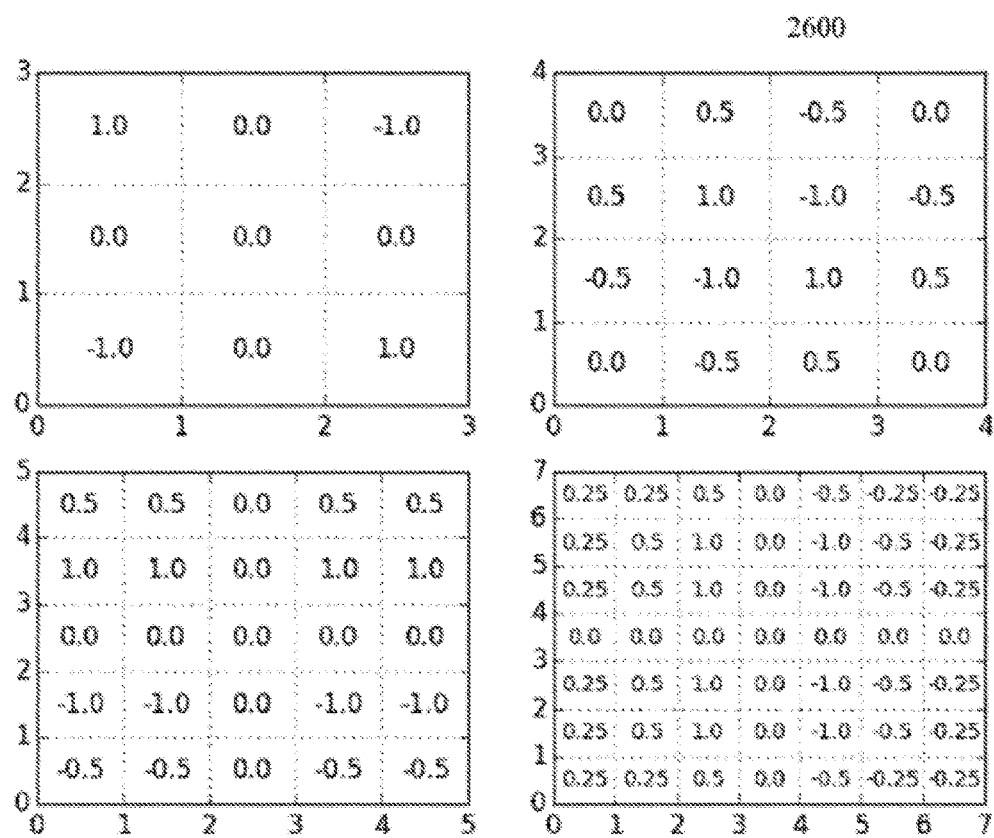
FIG. 26 shows example matched filter values.

A matched filter of configurable dimensions (e.g. 3×3, 4×4, 5×5, 7×7) and configurable values is applied to the raw data and anywhere the filter value exceeds a configurable threshold a potential touch location is recorded. The filter values depend on the panel location being processed. For general locations in the center of the panel where all data values exist for the filter function (i.e. none are user-set to zero) and depending on the target width, the matched filter values can be configured as in FIG. 26.

In order to avoid multiple detection of the same touch, any potential locations are removed from the raw data as they are detected as implemented in Appendix B. A noise-less model of the touch is used to calculate 'ideal' values for the potential touch location and these are substituted into the raw data. Using estimated values calculated from the touch model instead of zeroing the values, allows for better separation and accuracy when potential touch locations are close together.

Once a list of potential touch locations has been generated, the subset of the raw data corresponding to the potential touch location (e.g. the 3×3, 4×4, 5×5, and 7×7 square) is passed to the interpolator. In FIGS. 29 and 30, the interpolator converts the raw data into device-independent touch coordinates.

In other systems that work on single-ended (i.e. non-differential) data, the interpolator often uses a Gaussian fit or similar. Since the touch panel controller 116 operates on differential data, a different method is employed. Singular Value Decomposition (SVD) is a well-known method that decomposes a matrix into two matrices of basis vectors and a scaling matrix. Since decomposing the matrix is far too computationally involved for the touch panel controller 116 a simplified scheme was developed to estimate the coordinates as implemented in Appendix E.

Depending on the location of the potential touch on the touch panel, a rough mask is generated based on our model of a touch in the differential domain. For example, the mask in one coordinate direction for a 5×5 square is [0.5 1.0 0.0 −1.0 −0.5]. The mask is used as the first guess for estimating the dominant eigenvalue from the raw panel data in each coordinate direction.

The coordinate in each direction can then be estimated by employing the dominant eigenvalue for that coordinate direction in a linear interpolation to estimate the zero crossing. If size of the touch location extracted from the raw panel data overlaps an edge or corner, a different method for interpolation is used. In the case of overlapping an edge, the interpolation method for the coordinate direction perpendicular to the edge is adjusted because there is not enough touch information to use the original method. In this case, a quadratic fit is first used to determine the potential peak of the partial touch. Next the estimated peak is compared to a threshold value to determine whether the touch response is strong enough for the finger to be considered on the panel. Otherwise, if the touch falls beneath the threshold it is considered to be on the bezel of the touch panel.

After processing by the interpolator subsystem, the touch identifier is assigned to each touch coordinate pair. The touch identifier remains the same over the entire lifespan of the touch; from touch-down to touch-up. In order to assign the same touch identifiers from panel frame to panel frame, the current set up touch coordinate pairs is compared to the set of forecast/estimated touch coordinate pairs determined in the previous time step. For touch coordinate pairs that fall with the threshold distance from the estimate from the previous time step, the same touch identifier is assigned. For any touch coordinate pairs that have no corresponding estimate, a new touch identifier is assigned.

Finally, the touch coordinate estimates for the next time step are updated using a Kalman filter. The Kalman filter is normally used to estimate the current location of a tracked object from previous location data, however, the present embodiment feeds the current location into the Kalman filter and uses it to estimate the next touch coordinate as implemented in Appendix A.

The present disclosure provides improved methods for sensing coupling impedance in touch panels and like systems, wherein the improvements provide for increased sensitivity to test stimuli through use of simultaneous excitation with independent signals and reduced sensitivity to noise and signal leakage through use of differential drive and sense techniques; these techniques together providing desirable improved signal-to-noise ratio. Several types of test signal are discussed, including Fourier signals. Detection of received signals through correlation, median and recursive techniques is presented, as is restoration of information lost through the use of differential sensing and drive techniques.

The above-described embodiment of the disclosure are intended to be examples of the present disclosure and alterations and modifications may be effected thereto, by those of skill in the art, without departing from the scope of the disclosure which is defined solely by the claims appended hereto.

For example, one skilled in the art will recognize that the roles of rows and columns in the above description may be interchanged. They will also recognize that a large panel may be divided into two or more smaller subpanels, each with its own sensor and with an overall controller coordinating the subpanel sensors.

While specific embodiments have been described and illustrated, such embodiments should be considered illustrative only and should not serve to limit the accompanying claims.

APPENDIX A: Example Programmatic Implementation of Removing Multiple Detection of the Same Touch from Raw Data

```
# Kalman Predictive Filter
# Inputs
# x_next - The previous predicted location and velocity
# P - Estimated error of predicted position
# F - State transition
# Q - Covariance
# z - Error in measured position
# z_sig- Standard deviation
def kalman(x_next, P, F, Q, z, z_sig):
    P _next= np.dot(np.dot(F, P), F.T) + Q
    if not (np.isfinite(z) and np.isfinite(z_sig)):
        return x_next, P_next
    ytilde = z − x_next[0]
    S = P_next[0, 0] + z_sig
    K = P_next[:, 0]/S
    x_next = x_next + K *ytilde
    P _next= np.dot(np.eye(2)- np.array([K, [0, 0]]).T, P_next)
    if P_next[0, 0] < 0.0:
        raise NameError('negStd')
    if not all(np.isfinite(x_next)):
        raise N ameError('nanKalman')
    x_next = np.dot(F, x_next)
    return x_next, P_next
```

APPENDIX B: Example Programmatic Implementation of Removing Multiple Detection of the Same Touch from Raw Data

```
def update(self, frame):# goes and looks at the panel, and updates self and panel
    hotCol = slice(self.col_grid−hsMin, 1 +self.col_grid+hsMin)
    hotRow = slice(self.row grid−hsMin, 1 +self.row_grid+hsMin)'
    mask = self.svd_mask(panel, hsMask, hotRow, hotCol)
    Umat, Vmat = self.generateSVD(panel, mask, hotRow, hotCol)
    self.row_x, self.row_P, ySigma = update 1 D(self.row_ x, self.row_ P, self.row_grid, Umat,
self.F, self.row_Q)
    self.col_x, self.col_P, xSigma = update1D(self.col_x, self.col_P, self.col_grid, Vmat, self.F,
self.col_ Q)
```

```
        self.UVmats.append([frame, Vmat, self.col_x[0], Umat, self.row_x[0]]) #debug only!
        self.accuracy = self.row_P[0, 0] + self.col_P[0, 0]
        # now subtract the effect of this finger stimate from the panel, so it is not counted twice
        #panel[hotRow, hotCol] = 0.0 #this is the brute-force version
        #when a finger appears isolated, use its measured profiles; but if it's near another, use an idealized profile
        if any([finger.near( self.row_grid, self.col_grid, distance=3) for finger in fingers if finger ! = self]):
            U_model = [x for x in np.arange(hotspotSize )-hsMid-(self.row x[0]-self.row_grid)]
            V_model= [1100.0/(1 +(x-1.0)**2)-1100.0/(1 +(x+ 1.0)**2)for x in np.arange(hotspotSize)-hsMid-(self.col_x[0]-self.col_grid)]
            est = np.outer(U_model, V_model)
            #gain= np.dot(np.ravel(panel[hotRow, hotCol]), np.ravel(est))/np.dot(np.ravel(est), np.ravel(est)) #dot-product gain estimate
            peak= np.argmax(np.abs(np.ravel(est)))
            gain= np.ravel(panel[hotRow, hotCol])[peak ]/(np.ravel(est)[peak])
                # this underestimates gain in the case of nearby fingers.
        else:
            est= np.outer(Umat, Vmat) #this is the model, except it has an unknown gain
            #gain= np.dot(np.ravel(panel[hotRow, hotCol]), np.ravel(est))/np.dot(np.ravel(est),np.ravel(est)) #dot-product gain estimate
            peak= np.argmax(np.abs(np.ravel(est)))
            gain= np.ravel(panel[hotRow, hotCol])[peak ]/(np.ravel(est)[peak])
            # or could use sum of squares in denominator, or just guess gain from the known largest elements.
        panel[hotRow, hotCol] = panel[hotRow, hotCol]- gain * est
        if np.max(np.abs(np.ravel(panel[hotRow, hotCol]))) > hotThreshold:
            loc = np.argmax(np.abs(np.ravel(panel[hotRow, hotCol])))
            overflows[hotRow.start+loc//hotspotSize, hotCol.start+loc%hotspotSize] += 1
        if np.isnan(self.row_x[0]) or np.isnan(self.col_x[0]): #debugging only! should not occur print xEst, yEst, Umat, Vmat
        self.row_grid= int(np.clip(np.round(self.row_x[0]), hsMin, panel.shape[0]- hsMin -1))
        self.col_grid = int(np.clip(np.round(self.col_x[0]), hsMin, panel.shape[1] - hsMin -1))# recentre
        if xSigma>dudThreshold or ySigma>dudThreshold:
            return ['noFinger']
        if self. accuracy < accuracyThreshold:
            self.report.append([frame, self.row_x, self. col_x, self.row_P, self.col_P])
            return[' active']
        else:
            if (self. accuracy> dudThreshold) or not np.isfinite(self.accuracy):
                return ['dud']
            return ['weak']
    def svd_mask( self, panel, defaultMask, hotRow, hotCol):
        """ Generate the mask for the SVD initial value. """
        rows = panel.shape[0]
        cols =panel. shape[-1]
        mask = defaultMask
        edgeMask = np.array([0.7, 1.0, 0.7, 1.0, 0.7]);
        #import pdb; pdb.set_trace( )
        if (int(hotRow.start) == 0):
            # Left edge mask
            mask= [edgeMask[i] if(i >= hotspotSize/2) else 0 for i in range(hotspotSize)]
        elif (int(hotRow.start) ==rows):
            # Right edge mask
            mask= [edgeMask[i] if(i < hotspotSize/2) else 0 fori in range(hotspotSize)]
        elif (int(hotRow.start) > 0 and int(hotRow.start) <= hotspotSize/2):
            mask= [defaultMask[i] if(i >= hotspotSize/2) else 0 fori in range(hotspotSize)]
        else:
            # Default mask
            mask = hsMask
        return mask
```

APPENDIX C: Example Programmatic Implementation for an Interpolator Converting Raw Data Into Device-Independent Touch Coordinates

```
def update1D(x, P, grid, UVmat, F, Q):
    """ find best-guess finger centre in one dimension"""
    interp = x[0] – grid # x relative to hotspot centre
    xEst_grid, offset= interpLin(UVmat, interp)
    xEst = xEst_grid +grid+ offset #back to panel, not hotspot, coordinates
    xSigma = Resolution/(UVmat[hsMid+offset-1] – UVmat[hsMid+offset+1] –UVNoise)
    xSigma = xSigma + np.clip(np.abs(xEst_grid)-1.0, 0.0, hotspotSize**2) #penalty for a long jump
    ifxSigma<0.0 or not np.isfinite(xSigma):
        xSigma = hotspotSize**2
    x, P = kalman(x, P, F, Q, xEst, xSigma)
    return x, P, xSigma # Inputs
```

APPENDIX D: Example Programmatic Implementation for an Interpolator Converting Raw Data Into Device-Independent Touch Coordinates

```
def interpLin(UVmat, xhat):
        for offset in [0, -1, 1]:
            ym1 = UVmat[hsMid+offset-1]; y0= UVmat[hsMid+offset];
            y1 = UVmat[hsMid+offset+1]
            if ym1*y0 < 0:
                return y0/(ym1-y0), offset
            elif y1*y0 < 0:
                return y0/(y0-y1), offset
        offset= 0
        ym1 = UVmat[hsMid+offset-1]; y0= UVmat[hsMid+offset]; y1 =
        UVmat[hsMid+offset+1]
        return interp(ym1, y0, y1, xhat), 0 #desperate measure -- try a
quadratic. This may be pointless.
```

APPENDIX E: Example Programmatic Implementation of a Scheme for Estimating Co-Ordinates

```
def generateSVD(self, panel, mask, hotRow, hotCol):
        Vmat = np.ravel(np.matrix(mask)*panel[hotRow, hotCol])
        Umat = np.ravel(panel[hotRow, hotCol] *
        np.matrix(Vmat).T)/np.max(np.abs(Vmat))
        Vmat = np.ravel(np.matrix(Umat)*panel[hotRow,
        hotCol])/np.max(np.abs(Umat))
        return Umat, Vmat
```

What is claimed is:

1. A multi-touch sensing system for estimating a location of at least one touch point, the multi-touch sensing system comprising:
   a panel;
   a grid of conductor disposed on the panel, the grid of conductor configured to provide capacitances between rows and columns of the grid;
   a driver array connected to the grid, the driver array configured to transmit a set of overlapping and independent row drive signals to the grid;
   a receiver array connected to the grid for receiving column signals from the grid via a plurality of inputs, the receiver array configured to:
      sense a pre-charge voltage on a differential pair of inputs selected from the plurality of inputs;
      pre-charge the plurality of inputs to increase a voltage detection accuracy;
      pre-charge the plurality of inputs between sampling times to substantially equalize a common-mode input to a differential input;
      equalize a differential mode for the differential pair of inputs by returning the differential pair of inputs to the pre-charge voltage and reducing slow drifting due to slowly changing offsets; and
      produce digital estimates of the column signals;
   a signal processing system in communication with the driver array and the receiver array, the signal processing system configured to estimate a coupling capacitance between the columns and the rows by correlating the digital estimates of the column signals with the independent row drive signals; and
   a controller for transforming the coupling capacitance into touch co-ordinates by detecting and extracting potential touches from raw differential data collected from the panel.

2. The multi-touch sensing system of claim 1, wherein the driver array comprises a first driver and a second driver, the first driver and the second driver configured to transmit stimulus waveforms to a first drive line and a second drive line of the grid simultaneously.

3. The multi-touch sensing system of claim 2, wherein each of the stimulus waveforms are sinusoids having a distinct frequency and a distinct phase.

4. The multi-touch sensing system of claim 1, wherein the driver array is further configured to generate a programmable drive pattern allowing a frequency of the drive pattern to be changed to avoid potential interfering signals.

5. The multi-touch sensing system of claim 1, wherein the driver array is further configured to transmit to a first drive line and to a second drive line differentially, and momentarily short together the first drive line and the second drive line as the independent row drive signals of the first drive line and the second drive line cross when being driven in opposition.

6. The multi-touch sensing system of claim 1, wherein the driver array is further configured to integrate each of the independent row drive signals in analog and digital domains using at least one of an analog integrator and repeated patterns of the independent row drive signals.

7. The multi-touch sensing system of claim 6, wherein the receiver array is further configured to integrate each of the column signals in analog and digital domains using at least one of the analog integrator and repeated patterns of the column signals.

8. The multi-touch sensing system of claim 1, wherein the signal processing system is further configured to program delay adjustments and gain adjustments independently.

9. The multi-touch sensing system of claim 1, wherein the location of the at least one touch point is detected in the raw differential data.

10. The multi-touch sensing system of claim 9, wherein the controller transforms the coupling capacitance into touch co-ordinates using an interpolation method, wherein the touch co-ordinates are device independent.

11. The multi-touch sensing system of claim 10, wherein the interpolation method uses a modified Singular Value Decomposition (SVD) method to convert the differential raw data into device independent co-ordinates and/or a differently modified SVD method to convert the differential raw data into device independent co-ordinates in corners and along edges of the panel in order to maintain accuracy in the corners and the edges.

12. The multi-touch sensing system of claim 1, wherein the controller is further configured to use a Kalman filter to predict a next set up location by projecting the location of at least one touch point into a next panel scan time step.

13. A method of estimating a location of at least one touch point on a multi-touch sensing system, the method comprising:
   transmitting a set of overlapping and independent row drive signals to a grid using a driver array, wherein the grid comprises conductor disposed on a panel, the grid configured to provide capacitances between rows and columns of the grid;
   receiving column signals from the grid via a plurality of inputs using a receiver array, wherein receiving column signals comprises:
      sensing a pre-charge voltage on a differential pair of inputs selected from the plurality of inputs;
      pre-charging the plurality of inputs to increase a voltage detection accuracy;
      pre-charging the plurality of inputs between sampling times to substantially equalize a common-mode input to a differential input;

equalizing a differential mode for the differential pair of inputs by returning the differential pair of inputs to the pre-charge voltage and reducing slow drifting due to slowly changing offsets; and producing digital estimates of the column signals;

estimating a coupling capacitance between the columns and the rows by correlating the digital estimates of the column signals with the independent row drive signals using a signal processing system; and transforming the coupling capacitance into touch co-ordinates by detecting and extracting potential touches from raw differential data collected from the panel.

14. The method of claim 13, wherein transmitting comprises transmitting stimulus waveforms to a first drive line and a second drive line of the grid simultaneously.

15. The method of claim 13, wherein transmitting comprises transmitting to a first drive line and to a second drive line differentially, and momentarily shorting together the first drive line and the second drive line as the independent row drive signals of the first drive line and the second drive line cross when being driven in opposition.

16. The method of claim 13, further comprising programming, using the signal processing system, delay adjustments and gain adjustments independently.

17. The method of claim 13, further comprising detecting the location of the at least one touch point in the raw differential data.

18. The method of claim 17, wherein transforming the coupling capacitance into touch co-ordinates uses an interpolation method, and wherein the touch co-ordinates are device independent.

19. The method of claim 18, wherein the interpolation method uses a modified Singular Value Decomposition (SVD) method to convert the differential raw data into device independent co-ordinates and/or a differently modified SVD method to convert the differential raw data into device independent co-ordinates in the corners and along the edges of the panel in order to maintain accuracy in the corners and edges.

20. The method of claim 13, further comprising using a Kalman filter to predict a next set up location by projecting the location of at least one touch point into a next panel scan time step.

* * * * *

UNITED STATES PATENT AND TRADEMARK OFFICE
CERTIFICATE OF CORRECTION

PATENT NO. : 9,946,418 B2  
APPLICATION NO. : 14/878202  
DATED : April 17, 2018  
INVENTOR(S) : William Martin Snelgrove Page 1 of 1

It is certified that error appears in the above-identified patent and that said Letters Patent is hereby corrected as shown below:

In the Specification

Column 1, Line 16: delete "capacitative" and insert -- capacitive -- after "sensing touches in", therefor.
Column 1, Line 20: delete "Capacitative" and insert -- Capacitive -- before "panel touchscreens", therefor.
Column 1, Line 24: delete "capacitative" and insert -- capacitive -- before "touchscreens that can", therefor.
Column 1, Line 52: delete "capacitative" and insert -- capacitive -- after "sensing touches in", therefor.

Column 5, Line 41: delete "capacitative" and insert -- capacitive -- before "touch panel", therefor.

Column 7, Line 25: delete "capacitatively" and insert -- capacitively -- after "couples into the panel lines", therefor.

Signed and Sealed this  
Ninth Day of June, 2020

Andrei Iancu  
*Director of the United States Patent and Trademark Office*